(12) United States Patent
Guo et al.

(10) Patent No.: US 9,858,403 B2
(45) Date of Patent: Jan. 2, 2018

(54) LIVENESS DETERMINATION BASED ON SENSOR SIGNALS

(71) Applicant: QUALCOMM Incorporated, San Diego, CA (US)

(72) Inventors: Yinyi Guo, San Diego, CA (US); Minho Jin, Anyang (KR); JunCheol Cho, Seoul (KR); Yongwoo Cho, Seoul (KR); Lae-Hoon Kim, San Diego, CA (US); Erik Visser, San Diego, CA (US); Shuhua Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 15/013,889

(22) Filed: Feb. 2, 2016

(65) Prior Publication Data

US 2017/0220786 A1    Aug. 3, 2017

(51) Int. Cl.
*G06F 7/04*       (2006.01)
*G06F 21/32*     (2013.01)
*G06F 21/36*     (2013.01)
*H04L 29/06*    (2006.01)
*H04W 12/06*   (2009.01)

(52) U.S. Cl.
CPC ............. *G06F 21/32* (2013.01); *G06F 21/36* (2013.01); *H04L 63/0861* (2013.01); *H04W 12/06* (2013.01); *G06F 2221/2133* (2013.01)

(58) Field of Classification Search
CPC .................................. G06F 21/32; G06F 21/36
See application file for complete search history.

(56) References Cited

U.S. PATENT DOCUMENTS

| 6,256,737 | B1* | 7/2001 | Bianco | G07C 9/00158 |
| | | | | 713/186 |
| 7,016,833 | B2 | 3/2006 | Gable et al. | |
| 7,986,816 | B1* | 7/2011 | Hoanca | G06K 9/00597 |
| | | | | 382/115 |
| 9,171,548 | B2 | 10/2015 | Velius et al. | |
| 9,202,105 | B1* | 12/2015 | Wang | G06Q 20/4014 |
| 9,251,401 | B1* | 2/2016 | Koo | G06K 9/00288 |

(Continued)

FOREIGN PATENT DOCUMENTS

| EP | 1318459 A1 | 6/2003 |
| JP | 2006011591 A | 1/2006 |

(Continued)

OTHER PUBLICATIONS

International Search Report and Written Opinion—PCT/US2016/068398—ISA/EPO—dated Apr. 3, 2017.

*Primary Examiner* — Techane Gergiso
(74) *Attorney, Agent, or Firm* — Toler Law Group, P.C.

(57) ABSTRACT

A device includes a memory and a processor. The memory is configured to store a threshold. The processor is configured to authenticate a user based on authentication data. The processor is also configured to, in response to determining that the user is authenticated, generate a correlation score indicating a correlation between a first signal received from a first sensor and a second signal received from a second sensor. The processor is also configured to determine liveness of the user based on a comparison of the correlation score and the threshold.

30 Claims, 15 Drawing Sheets

(56) References Cited

U.S. PATENT DOCUMENTS

| | | | |
|---|---|---|---|
| 2005/0071635 A1* | 3/2005 | Furuyama | G06F 21/32 713/168 |
| 2006/0206724 A1 | 9/2006 | Schaufele et al. | |
| 2007/0160230 A1 | 7/2007 | Nakagomi | |
| 2010/0328033 A1* | 12/2010 | Kamei | A61B 8/0875 340/5.82 |
| 2011/0274318 A1* | 11/2011 | Shindo | A61B 5/117 382/115 |
| 2012/0019379 A1* | 1/2012 | Ben Ayed | G08B 13/1436 340/539.1 |
| 2012/0253810 A1* | 10/2012 | Sutton | G10L 17/24 704/246 |
| 2012/0282976 A1* | 11/2012 | Suhami | G10K 11/1786 455/556.1 |
| 2013/0043977 A1 | 2/2013 | Velius et al. | |
| 2014/0307929 A1* | 10/2014 | Nechyba | G06K 9/00228 382/118 |
| 2014/0310803 A1* | 10/2014 | Irie | G06F 21/32 726/19 |
| 2014/0331313 A1* | 11/2014 | Kim | G06F 21/32 726/16 |
| 2015/0046162 A1* | 2/2015 | Aley-Raz | G10L 17/24 704/247 |
| 2015/0104081 A1* | 4/2015 | Ionita | G06K 9/4614 382/117 |
| 2015/0288674 A1* | 10/2015 | Lautenschlager | H04L 63/0861 726/4 |
| 2015/0301796 A1* | 10/2015 | Visser | G06F 3/167 715/728 |
| 2016/0182505 A1* | 6/2016 | Hoyos | H04L 63/0861 726/4 |

FOREIGN PATENT DOCUMENTS

| | | |
|---|---|---|
| KR | 101219957 B1 | 1/2013 |
| WO | 2015/028916 A1 | 3/2015 |

* cited by examiner

LIVENESS DETERMINATION BASED ON SENSOR SIGNALS

I. FIELD

The present disclosure is generally related to liveness determination based on sensor signals.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Computing devices may be used to access sensitive information. A password may be used to provide secure access to a computing device. For example, a text password may be used to access the computing device or a particular application of the computing device. Security of the computing device may be compromised if an unauthorized user has (or guesses) the text password. User verification may be performed based on an acoustic signal corresponding to a voice of a user. However, voice biometric technologies are subject to spoofing attacks. For example, a voice recording of a user may be used to access a user account in an application that uses voice-based verification. Liveness tests may be used to detect whether audio is received from a live user or a recording. When a recording is detected, access to the user account may be denied. When a live user is detected, access may be granted to the user account in response to determining that the audio corresponds to a voice of an authorized user. A liveness test may include questions that ask a user to provide additional information. Liveness tests that are based on challenge questions may make the verification process more burdensome for the user, thereby adversely impacting the user experience.

III. SUMMARY

In a particular aspect, a device includes a memory and a processor. The memory is configured to store a threshold. The processor is configured to authenticate a user based on authentication data. The processor is also configured to, in response to determining that the user is authenticated, generate a correlation score indicating a correlation between a first signal received from a first sensor and a second signal received from a second sensor. The processor is also configured to determine liveness of the user based on a comparison of the correlation score and the threshold.

In another particular aspect, a method of authentication includes determining, at a device, that a user is authenticated based on authentication data. The method also includes, in response to determining that the user is authenticated, generating a correlation score indicating a correlation between a first signal received from a first sensor and a second signal received from a second sensor. The method further includes determining, at the device, liveness of the user based on a comparison of the correlation score and a threshold.

In another particular aspect, a computer-readable storage device stores instructions that, when executed by a processor, cause the processor to perform operations including authenticating a user based on authentication data. The operations also include, in response to determining that the user is authenticated, generating a correlation score indicating a correlation between a first signal received from a first sensor and a second signal received from a second sensor. The operations further include determining liveness of the user based on a comparison of the correlation score and a threshold.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
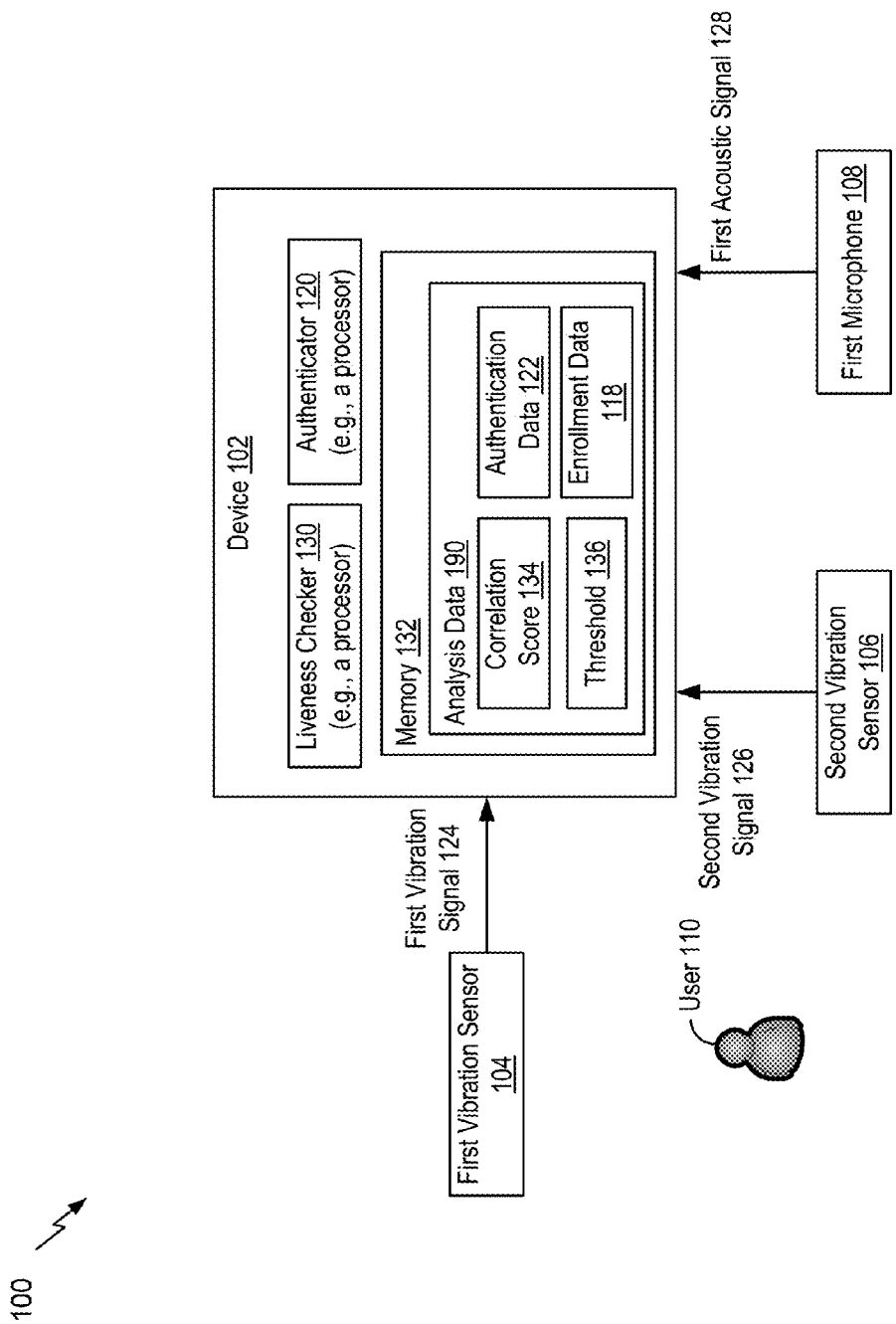
FIG. 1 is a block diagram of a particular illustrative aspect of a system configured to perform liveness determination based on sensor signals.

Systems and methods of sensor-based liveness determination are disclosed. A device may include or may be coupled to a plurality of sensors. For example, the device may be coupled to at least one vibration sensor, at least one acoustic sensor, or a combination thereof. When a user speaks, vibrations may propagate through the body of the user. A first vibration sensor may generate a first vibration signal corresponding to the vibrations that propagate through the body of the user. A second vibration sensor may generate a second vibration signal corresponding to the vibrations that propagate through the body of the user. The first vibration signal may be distinct from the second vibration signal because the first vibration sensor may be located at a first part of the body and the second vibration sensor may be located at a second part of the body that is distinct from the first part of the body. A first acoustic sensor may capture an acoustic signal corresponding to the speech of the user. A correlation between the first vibration signal and the second vibration signal, between the first vibration signal and the acoustic signal, or both, may indicate a live user.

A spoofed acoustic signal based on an audio recording of the speech of the user may correspond to the original acoustic signal. A spoofed vibration signal may be generated by a vibration sensor based on vibration signals propagated through a body of an unauthorized user speaking the words corresponding to the original speech of the user. A correlation between the spoofed vibration signal and the spoofed acoustic signal may differ from the correlation between the first vibration signal and the original acoustic signal. Similarly, a correlation between multiple spoofed vibration signals may differ from a correlation between the first vibration signal and the second vibration signal. The correlation between the first vibration signal and the second vibration signal, between the first vibration signal and the acoustic signal, or both, may be relatively unique to the user.

During an enrollment stage, the device may perform liveness determination based on enrollment sensor signals received from the plurality of sensors. For example, the first device may determine an enrollment correlation score based on the enrollment sensor signals. The device may determine that the enrollment sensor signals correspond to a live user in response to determining that the enrollment correlation score satisfies an enrollment correlation threshold. The device may store enrollment data (e.g., a password, a finger print image) of an enrolling user in response to determining that the enrollment sensor signals correspond to a live user.

During a testing stage, the device may perform liveness determination based on testing sensor signals received from the plurality of sensors. For example, the device may determine a correlation score based on the testing sensor signals. The device may determine that the testing sensor signals correspond to a live user (e.g., the enrolled user) in response to determining that the correlation score satisfies a threshold. The device may authenticate the user based on a comparison of the enrollment data and authentication data. The device may determine that the user is authorized in response to determining that the user is authenticated and that the testing sensor signals correspond to a live user (e.g., the enrolled user).

The device may perform passive liveness determination during general use of the device. For example, the sensor signals may be received by the device without the user being aware that a liveness determination is being performed. The sensor-based liveness determination, when successful, may be performed without burdening the user with answering challenge questions to provide additional information to determine liveness. The sensor-based liveness determination may thus improve the user experience.

Referring to FIG. 1, a system is shown and generally designated 100. The system 100 includes a device 102. The device 102 may include a liveness checker 130 (e.g., a processor or a hardware circuit), an authenticator 120 (e.g., a processor or a hardware circuit), a memory 132, or a combination thereof. The device 102 may include or be coupled to a plurality of sensors (e.g., a vibration sensor, a microphone, or both). For example, the device 102 may be coupled to a first vibration sensor 104, a second vibration sensor 106, a first microphone 108, or a combination thereof. To illustrate, the first vibration sensor 104, the second vibration sensor 106, or both, may be configured to generate a signal corresponding to vibrations through a cavity, a bone, or both, of a human body.

The device 102 may include fewer or more components than illustrated in FIG. 1. For example, the device 102 may include one or more processors, one or more memory units, or both. The device 102 may include or correspond to a networked or a distributed computing system. In a particular illustrative aspect, the device 102 may include or correspond to at least one of a mobile phone, a communication device, a computer, a music player, a video player, an entertainment unit, a navigation device, a personal digital assistant (PDA), a decoder, or a set top box.

During a testing stage, the device 102 may receive a plurality of signals from a plurality of sensors. For example, the device 102 may receive a first vibration signal 124 from the first vibration sensor 104, a second vibration signal 126 from the second vibration sensor 106, a first acoustic signal 128 from the first microphone 108, or a combination thereof. To illustrate, a user 110 may be speaking while wearing earphones, bone conduction headphones, a wristband, glasses, a necklace, a back brace, etc. The first vibration sensor 104 may be included in a first device, such as the earphones, and the second vibration sensor 106 may be included in another device, such as the wristband. The first vibration signal 124 may correspond to vibrations through a first portion (e.g., an ear) of the body of the user 110 while the user 110 is speaking. The second vibration signal 126 may correspond to vibrations through a second portion (e.g., a wrist) of the body of the user 110 while the user 110 is speaking. The first acoustic signal 128 may correspond to acoustic data collected by the first microphone 108 while the user 110 is speaking. The device 102 may receive the first acoustic signal 128 at approximately the same time as receiving the first vibration signal 124, the second vibration signal 126, or both. The first acoustic signal 128 may have a first timestamp that is approximately the same as a first particular timestamp of the first vibration signal 124, a second particular timestamp of the second vibration signal 126, or both.

During the testing stage, the device 102 may perform authentication, liveness checking, or both, as described herein. The device 102 may receive authentication data 122 from the user 110. The authentication data 122 may include acoustic, non-acoustic data, or both. For example, the authentication data 122 may include at least one of an alphanumeric password, a finger print, an iris scan, a facial image, or a verbal password. The device 102 may determine the authentication data 122 based on input received via an input device (e.g., a keyboard, a finger print sensor, a camera, an iris scanner, and/or the first microphone 108) that is coupled to or in communication with the device 102. For example, the authentication data 122 may be based on the first acoustic signal 128. To illustrate, the user 110 may speak a verbal password. The authenticator 120 may generate the authentication data 122 by performing speech recognition on the first acoustic signal 128. The authenticator 120 may determine that authentication is successful in response to determining that the authentication data 122 matches enrollment data 118. The enrollment data 118 may be associated with an authorized (e.g., enrolled) user, as described with reference to FIG. 2.

In a particular aspect, the authenticator 120 may generate a similarity score based on the authentication data 122 and the enrollment data 118. The authenticator 120 may determine that the authentication data 122 matches the enrollment data 118 in response to determining that the similarity score satisfies a similarity threshold. The enrollment data 118 may be generated during an enrollment stage, as further described with reference to FIG. 2.

The liveness checker 130 may, in response to determining that the authentication is successful, determine liveness of the user 110. For example, the liveness checker 130 may generate a correlation score 134 based on the first acoustic signal 128, the first vibration signal 124, the second vibration signal 126, or a combination thereof. For example, the correlation score 134 may correspond to a vibration score, an acoustic-vibration correlation score, a vibration-vibration correlation score, or a combination thereof. To illustrate, the correlation score 134 (e.g., a vibration score) may indicate a measure (e.g., range) of vibration corresponding to the first vibration signal 124, the second vibration signal 126, or both. In a particular aspect, the correlation score 134 (e.g., an acoustic-vibration correlation score) may indicate a correlation between the first acoustic signal 128 and the first vibration signal 124, between the first acoustic signal 128 and the second vibration signal 126, or both. In a particular aspect, the correlation score 134 (e.g., a vibration-vibration correlation score) may indicate a correlation between the first vibration signal 124 and the second vibration signal 126.

In a particular aspect, the liveness checker 130 may extract first acoustic features based on the first acoustic signal 128, first vibration features based on the first vibration signal 124, second vibration features based on the second vibration signal 126, or a combination thereof. The liveness checker 130 may determine the correlation score 134 based on the first vibration features, the second vibration features, or both. For example, the correlation score 134 may indicate a measure of vibration corresponding to the first vibration features, the second vibration features, or both. In a particular aspect, the liveness checker 130 may determine the correlation score 134 based on the first acoustic features and the first vibration features. For example, the correlation score 134 may indicate a correlation between the first acoustic features and the first vibration features. In a particular aspect, the liveness checker 130 may determine the correlation score 134 based on the first vibration features and the second vibration features. For example, the correlation score 134 may indicate a correlation between the first vibration features and the second vibration features.

The liveness checker 130 may determine liveness of the user 110 based on a comparison of the correlation score 134 and a threshold 136. The threshold 136 may be indicative of a threshold correlation between a first particular acoustic signal generated by the first microphone 108 and a first particular vibration signal generated by the first vibration sensor 104, between the first particular vibration signal and a second particular vibration signal generated by the second vibration sensor 106, or both. In a particular aspect, the threshold 136 may be indicative of a threshold measure of vibration of a first particular vibration signal, a second particular vibration signal, or both. The first particular vibration signal may correspond to first vibrations that propagate through a body (e.g., a bone, a cavity, or both) of a live user (e.g., an authorized user) when sounds corresponding to a particular acoustic signal are generated by the user. The second particular vibration signal may correspond to second vibrations that propagate through a body (e.g., a bone, a cavity, or both) of the live user (e.g., an authorized user) when sounds corresponding to the particular acoustic signal are generated by the user. The particular acoustic signal may be similar to the first acoustic signal 128. In a particular aspect, the threshold 136 may be based on vibration signals corresponding to a single user (e.g., an enrolled user, such as the user 110), as further described with reference to FIG. 2. In an alternate aspect, the threshold 136 may be based on vibration signals corresponding to multiple users. For example, the threshold 136 may be based on a generic model of vibration signals. In a particular aspect, the liveness checker 130 may generate the threshold 136 based on an anti-spoofing model (e.g., an acoustic model, a vibration model, or both), as further described with reference to FIG. 5.

The liveness checker 130 may determine that the first acoustic signal 128 corresponds to a live user (e.g., as opposed to a recording) in response to determining that the correlation score 134 satisfies the threshold 136. The liveness checker 130 may determine that the user 110 is authorized in response to determining that the authentication data 122 matches the enrollment data 118, that the first acoustic signal 128 corresponds to a live user, or both. The liveness checker 130 may, in response to determining that the user 110 is authorized, enable access to at least one of the device 102, an application of the device 102, a remote application, or protected data.

In a particular aspect, the liveness checker 130 may determine that the first acoustic signal 128 does not correspond to a live user in response to determining that the correlation score 134 fails to satisfy the threshold 136. The liveness checker 130 may, in response to determining that the first acoustic signal 128 does not correspond to a live user, display an error message, prompt the user 110 to provide additional information, send an alert to another device, disable access to the device 102, disable access to an application of the device 102, or a combination thereof.

The system 100 thus enables passive liveness testing that may be performed in the background during use of the device 102. For example, the liveness checker 130 may determine liveness of the user 110 based on the first acoustic signal 128 that is received during general use of the device 102 without prompting the user 110 to provide the first acoustic signal 128. The first acoustic signal 128 may be received concurrently with the authentication data 122. In cases where the liveness checker 130 determines that the first acoustic signal 128 corresponds to a live user, the user 110 may be unaware that the device 102 has performed a liveness determination.

Figure 2:
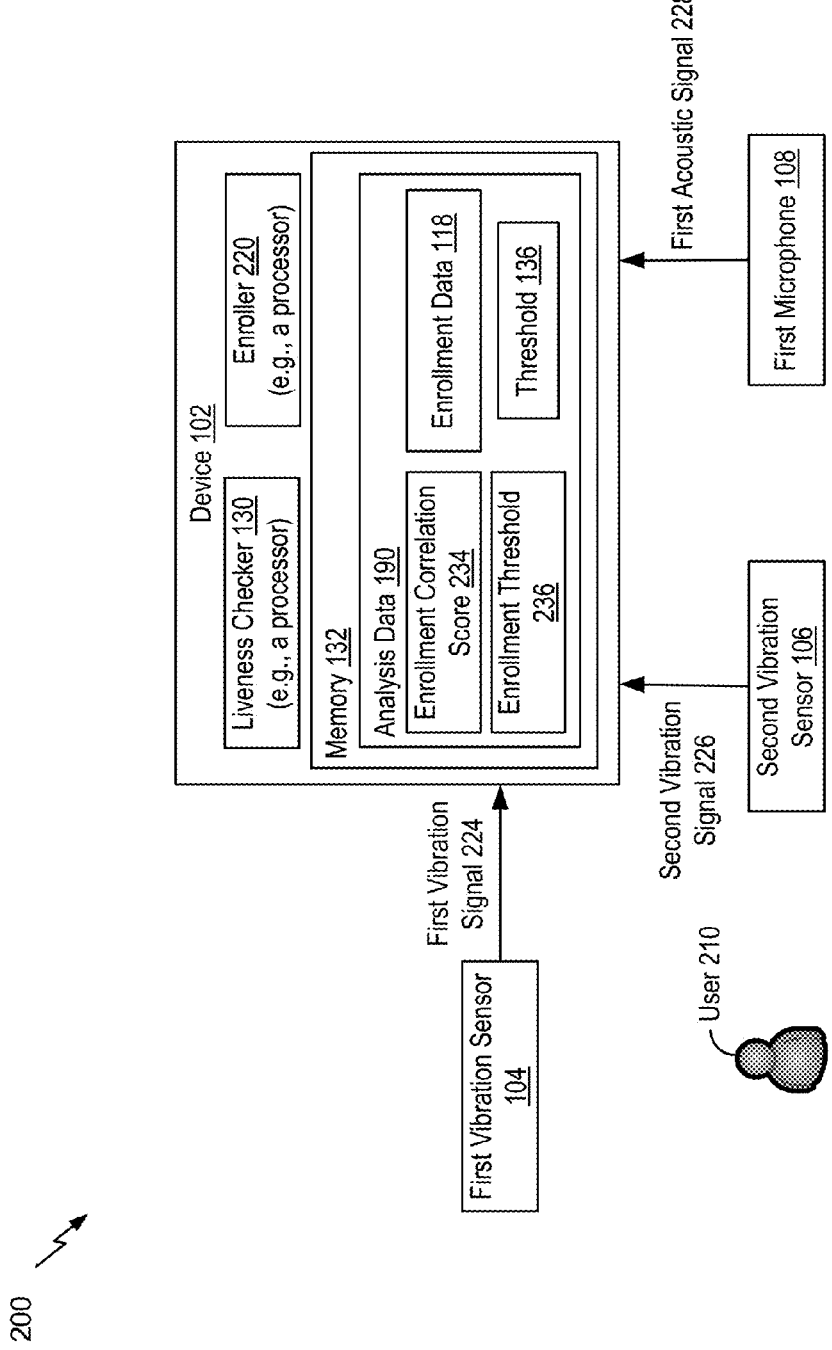
FIG. 2 is a diagram illustrating another particular aspect of a system configured to perform liveness determination based on sensor signals.

Referring to FIG. 2, a system is shown and generally designated 200. The system 200 may correspond to the system 100 of FIG. 1. For example, the system 100 may include one or more components of the system 200. The system 200 includes an enroller 220 (e.g., a processor or a hardware circuit).

During an enrollment stage, the device 102 may receive a plurality of signals from a plurality of sensors. For example, the device 102 may receive a first vibration signal 224 from the first vibration sensor 104, a second vibration signal 226 from the second vibration sensor 106, a first acoustic signal 228 from the first microphone 108, or a combination thereof. The first vibration signal 224 may correspond to vibrations through a first portion (e.g., an ear) of the body of a user 210 while the user 210 is speaking. The second vibration signal 226 may correspond to vibrations through a second portion (e.g., a wrist) of the body of the user 210 while the user 210 is speaking. The first acoustic signal 228 may correspond to acoustic data collected by the first microphone 108 while the user 210 is speaking. The user 210 may be the same as the user 110 of FIG. 1.

The liveness checker 130 may generate an enrollment correlation score 234 based on the first acoustic signal 228, the first vibration signal 224, the second vibration signal 226, or a combination thereof. For example, the enrollment correlation score 234 (e.g., vibration correlation score) may indicate a measure of vibration in a vibration signal (e.g., the first vibration signal 224, the second vibration signal 226, or both). As another example, the enrollment correlation score 234 (e.g., acoustic-vibration correlation score) may indicate a correlation between the first acoustic signal 228 and a vibration signal (e.g., the first vibration signal 224, the second vibration signal 226, or both). As a further example, the enrollment correlation score 234 (e.g., a vibration-vibration correlation score) may indicate a correlation between the first vibration signal 124 and the second vibration signal 126. The enrollment correlation score 234 may be associated with the user 210.

In a particular aspect, the liveness checker 130 may extract first acoustic features based on the first acoustic signal 228, first vibration features based on the first vibration signal 224, second vibration features based on the second vibration signal 226, or a combination thereof. The liveness checker 130 may determine the enrollment correlation score 234 based on the first vibration features, the second vibration features, or both. For example, the enrollment correlation score 234 may indicate a measure of vibration corresponding to the first vibration signal 224, the second vibration signal 226, or both. In a particular aspect, the liveness checker 130 may determine the enrollment correlation score 234 based on the first acoustic features and the first vibration features. For example, the enrollment correlation score 234 may indicate a correlation between the first acoustic features and the first vibration features. In a particular aspect, the liveness checker 130 may determine the enrollment correlation score 234 based on the first vibration features and the second vibration features. For example, the enrollment correlation score 234 may indicate a correlation between the first vibration features and the second vibration features. In a particular aspect, the liveness checker 130 may generate (or update) an anti-spoofing model based on enrollment features (e.g., the first acoustic features, the first vibration features, the second vibration features, or a combination thereof). The liveness checker 130 may determine the threshold 136 based on the anti-spoofing model, as further described with reference to FIG. 5.

The liveness checker 130 may determine liveness of the user 210 based on the enrollment correlation score 234 and an enrollment threshold 236. The enrollment threshold 236 may indicate a threshold correlation between a first particular acoustic signal generated by the first microphone 108 and a first particular vibration signal generated by the first vibration sensor 104, between the first particular vibration signal and a second particular vibration signal generated by the second vibration sensor 106, or both. In a particular aspect, the enrollment threshold 236 may indicate a threshold measure of vibration of a first particular vibration signal, a second particular vibration signal, or both. The first particular vibration signal may correspond to first vibrations that propagate through a body (e.g., a bone, a cavity, or both) of a particular user (e.g., a generic user) when sounds corresponding to a particular acoustic signal are generated by the user. The second particular vibration signal may correspond to second vibrations that propagate through a body (e.g., a bone, a cavity, or both) of a particular user (e.g., a generic user) when sounds corresponding to the particular acoustic signal are generated by the user. The particular acoustic signal may be similar to the first acoustic signal 228.

In a particular aspect, the liveness checker 130 may generate the enrollment threshold 236 based on an anti-spoofing model (e.g., an acoustic model, a vibration model, or both). The anti-spoofing model may correspond to a generic user. For example, the anti-spoofing model may be based on vibration signals, acoustic signals, or both, corresponding to multiple users. To illustrate, the anti-spoofing model may be based on first acoustic features of one or more first acoustic signals, first vibration features of one or more first vibration signals, second vibration features of one or more second vibration signals, or a combination thereof. The first vibration sensor 104 may be of a first type (e.g., a sensor in earphones). The first vibration signals may be received from a vibration sensor of a second type that is the same as (or similar to) the first type. The second vibration sensor 106 may be of a first particular type (e.g., a sensor in a wristband). The second vibration signals may be received from a vibration sensor of a second particular type that is the same as (or similar to) the first particular type.

The anti-spoofing model may indicate a correlation score between the first acoustic features and the first vibration features, between the first vibration features and the second vibration features, or both. The anti-spoofing model may indicate a correlation score associated with a measure of vibration corresponding to the first vibration features, the second vibration features, or both. The first vibration features, the second vibration features, or both, may correspond to the first acoustic features. For example, the first acoustic signals may be associated with a first timestamp that is approximately the same as a first particular timestamp associated with the first vibration features and a second particular timestamp associated with the second vibration features.

The liveness checker 130 may determine the enrollment threshold 236 based on the anti-spoofing model and the first acoustic signal 228. For example, the liveness checker 130 may determine acoustic features based on the first acoustic signal 228 and may determine the enrollment threshold 236 corresponding to the acoustic features based on the anti-spoofing model.

The liveness checker 130 may determine that the first acoustic signal 228 corresponds to a live user in response to determining that the enrollment correlation score 234 satisfies (e.g., is greater than or equal to) the enrollment threshold 236. The enroller 220 may, in response to determining that the first acoustic signal 228 corresponds to a live user, store the enrollment data 118 in the memory 132. For example, during the enrollment stage, the enroller 220 may prompt the user 210 to provide the enrollment data 118 and the liveness checker 130 may concurrently perform the liveness determination. The enrollment data 118 may include at least one of an alphanumeric password, a finger print, an iris scan, a facial image, or a verbal password. The enroller 220 may receive the enrollment data 118 from the user 210. For example, the enroller 220 may determine the enrollment data 118 based on input received via an input device (e.g., a keyboard, a finger print sensor, a camera, an iris scanner, and/or the first microphone 108) that is coupled to or in communication with the device 102. For example, the enrollment data 118 may be based on the first acoustic signal 228. To illustrate, the user 210 may speak a verbal password.

The enroller 220 may generate the enrollment data 118 by performing speech recognition on the first acoustic signal 228.

The enroller 220 may, in response to determining that the first acoustic signal 228 corresponds to a live user, store the enrollment data 118 in the memory 132. The enrollment data 118 may be associated with an authorized user (e.g., the user 210). For example, the enrollment data 118 may be associated with an identifier (e.g., a username) corresponding to the user 210.

In a particular aspect, the threshold 136 used during the testing stage may be based on the enrollment correlation score 234 determined during the enrollment stage. For example, the liveness checker 130 may determine the threshold 136 based on the enrollment correlation score 234 (e.g., the threshold 136=the enrollment correlation score 234+a tolerance value). To illustrate, the liveness checker 130 may store a sum of the enrollment correlation score 234 and a tolerance value in the memory 132 as the threshold 136.

In a particular aspect, the liveness checker 130 may determine that the first acoustic signal 228 does not correspond to a live user in response to determining that the enrollment correlation score 234 fails to satisfy (e.g., is less than) the enrollment threshold 236. The enroller 220 may, in response to determining that the first acoustic signal 228 does not correspond to a live user, display an error message, prompt the user 210 to provide additional information, send an alert to another device, disable access to the device 102, disable access to an application of the device 102, or a combination thereof.

The system 200 thus enables determining liveness of the user 210 during an enrollment stage. The liveness determination may be performed in the background concurrently with receiving the enrollment data 118 from the user 210.

Figure 3:
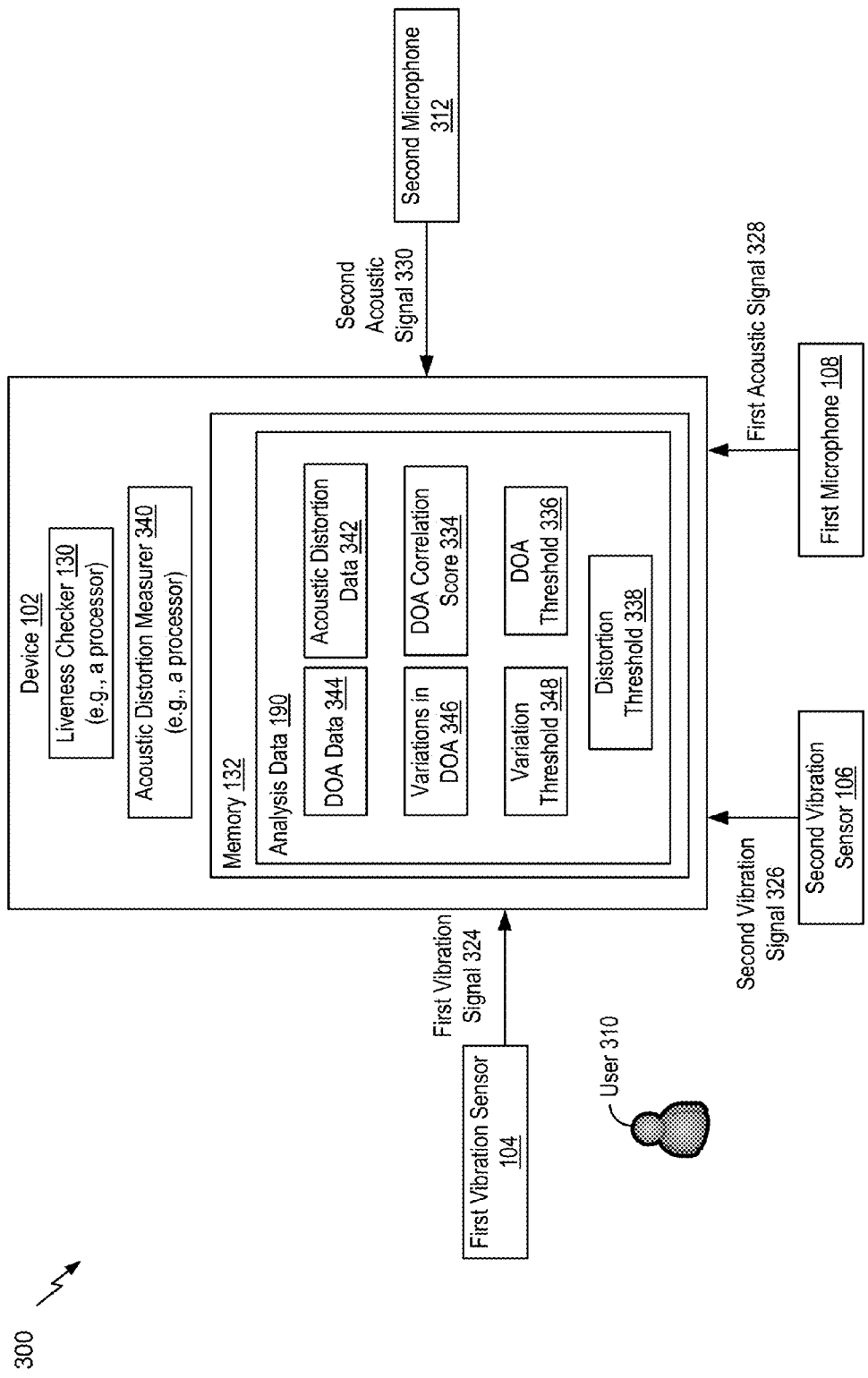
FIG. 3 is a diagram illustrating another particular aspect of a system configured to perform liveness determination based on sensor signals.

Referring to FIG. 3, a system is shown and generally designated 300. The system 300 may correspond to the system 100 of FIG. 1, the system 200 of FIG. 2, or both. For example, the system 100 may include one or more components of the system 300. As another example, the system 200 may include one or more components of the system 300.

The device 102 may include an acoustic distortion measurer 340 (e.g., a processor or a circuit). The acoustic distortion measurer 340 may be configured to measure acoustic distortion in an acoustic signal. The device 102 may be coupled to a second microphone 312.

During operation, the device 102 may receive a first vibration signal 324 (e.g., the first vibration signal 124 of FIG. 1 or the first vibration signal 224 of FIG. 2) from the first vibration sensor 104, a second vibration signal 326 (e.g., the second vibration signal 126 of FIG. 1 or the second vibration signal 226 of FIG. 2) from the second vibration sensor 106, a first acoustic signal 328 (e.g., the first acoustic signal 128 of FIG. 1 or the first acoustic signal 228 of FIG. 2) from the first microphone 108, a second acoustic signal 330 from the second microphone 312, or a combination thereof. The second acoustic signal 330 may correspond to acoustic data collected by the second microphone 312 while a user 310 (e.g., the user 110 of FIG. 1 or the user 210 of FIG. 2) is speaking.

The acoustic distortion measurer 340 may generate acoustic distortion data 342 based on the first acoustic signal 328. The acoustic distortion data 342 may indicate a level of acoustic distortion in the first acoustic signal 328. In a particular aspect, the acoustic distortion measurer 340 may extract acoustic features from the first acoustic signal 328. The acoustic distortion measurer 340 may determine a classification score based on the acoustic features and an acoustic model. The acoustic distortion data 342 may include the classification score. First acoustic distortion of a first acoustic signal received from a recording may be higher than a second acoustic distortion of a second acoustic signal received from a live user. The liveness checker 130 may perform a first liveness determination of the user 310 based on the acoustic distortion data 342 and an acoustic distortion threshold 338. For example, the liveness checker 130 may determine that the first liveness determination is successful in response to determining that the acoustic distortion data 342 satisfies (e.g., is less than) the acoustic distortion threshold 338. Alternatively, the liveness checker 130 may determine that the first acoustic signal 328 does not correspond to a live user in response to determining that the acoustic distortion data 342 fails to satisfy (e.g., is greater than or equal to) the acoustic distortion threshold 338. The liveness checker 130 may, in response to determining that the first acoustic signal 328 does not correspond to a live user, display an error message, prompt the user 310 to provide additional information, send an alert to another device, disable access to the device 102, disable access to an application of the device 102, or a combination thereof.

In a particular implementation, the liveness checker 130 may, in response to determining that the first liveness determination is successful, determine that the first acoustic signal 328 corresponds to a live user. In an alternative implementation, the liveness checker 130 may, in response to determining that the first liveness determination is successful, perform a second liveness determination, generate a direction of arrival (DOA) correlation score 334, as described herein, generate the correlation score 134 of FIG. 1, or generate the enrollment correlation score 234 of FIG. 2.

The liveness checker 130 may generate DOA data 344 based on a plurality of acoustic signals (e.g., the first acoustic signal 328 and the second acoustic signal 330) received from a plurality of microphones (e.g., the first microphone 108 and the second microphone 312). The DOA data 344 may indicate DOA corresponding to the first acoustic signal 328 and the second acoustic signal 330. For example, when the first acoustic signal 328 and the second acoustic signal 330 are generated by a live user (e.g., the user 310), the DOA may vary with a movement of the lips of the user 310. When the first acoustic signal 328 and the second acoustic signal 330 are generated by a recording, the DOA may vary with a movement of a playback device. For example, when the playback device is stationary, the DOA may vary little or not at all.

The liveness checker 130 may determine variations in DOA 346 based on the DOA data 344. The variations in DOA 346 may indicate a measure (e.g. an average) of absolute changes in the DOA (as indicated by the DOA data 344) over a time period. For example, the DOA data 344 may indicate that the DOA corresponds to a first DOA value at a time t1, to a second DOA value at a time t2, and to a third DOA value at a time t3. The variations in DOA 346 may be based on absolute differences between the DOA values (e.g., the variations in DOA 346=|first DOA value−second DOA value|+|second DOA value−third DOA value|).

The liveness checker 130 may, in response to determining that the variations in DOA 346 fail to satisfy a variation threshold 348, determine that the first acoustic signal 328 does not correspond to a live user. The variation threshold 348 may be indicative of a threshold variation when sounds corresponding to the first acoustic signal 328 are received from a live user. The liveness checker 130 may, in response to determining that the first acoustic signal 328 does not correspond to a live user, prompt the user 310 to provide additional information, send an alert to another device, disable access to the device 102, disable access to an application of the device 102, or a combination thereof.

The liveness checker 130 may, in response to determining that the variations in DOA 346 satisfy the variation threshold 348, determine that the second liveness determination is successful. The liveness checker 130 may, in response to determining that the second liveness determination is successful, generate the DOA correlation score 334, as described herein, the correlation score 134 of FIG. 1, or the enrollment correlation score 234 of FIG. 2.

The liveness checker 130 may generate the DOA correlation score 334 indicating a particular correlation between the DOA indicated by the DOA data 344 and the first acoustic signal 328. The liveness checker 130 may determine liveness of the user 310 based on a comparison of the DOA correlation score 334 and a DOA threshold 336. The DOA threshold 336 may indicative of a threshold correlation between the DOA and the first acoustic signal 328 when sounds corresponding to the first acoustic signal 328 are generated by a live user. For example, the liveness checker 130 may determine that the first acoustic signal 328 corresponds to a live user in response to determining that the DOA correlation score 334 satisfies the DOA threshold 336.

One or more of the acoustic distortion threshold 338, the variation threshold 348, or the DOA threshold 336 may include default values. One or more of the acoustic distortion threshold 338, the variation threshold 348, or the DOA threshold 336 may include values based on generic sample data associated with a plurality of users.

In a particular implementation, during the testing stage, one or more of the acoustic distortion threshold 338, the variation threshold 348, or the DOA threshold 336 may include values based on data associated with the user 210 of FIG. 2. For example, the acoustic distortion threshold 338 used during the testing stage may be based on the acoustic distortion data 342 determined during the enrollment stage (e.g., the acoustic distortion threshold 338 (testing stage) =the acoustic distortion data 342 (enrollment stage)+a tolerance value). As another example, the variation threshold 348 used during the testing stage may be based on the variations in DOA 346 determined during the enrollment stage (e.g., the variation threshold 348 (testing stage)=the variations in DOA 346 (enrollment stage)+a tolerance value). As a further example, the DOA threshold 336 used during the testing stage may be based on the DOA correlation score 334 determined during the enrollment stage (e.g., the DOA threshold 336 (testing stage)=the DOA correlation score 334 (enrollment stage)+a tolerance value).

In a particular aspect, the DOA correlation score 334 may correspond to the correlation score 134 of FIG. 1 and the DOA threshold 336 may correspond to the threshold 136 of FIG. 1. In a particular aspect, the DOA correlation score 334 may correspond to the enrollment correlation score 234 of FIG. 2 and the DOA threshold 336 may correspond to the enrollment threshold 236 of FIG. 2.

Figure 4:
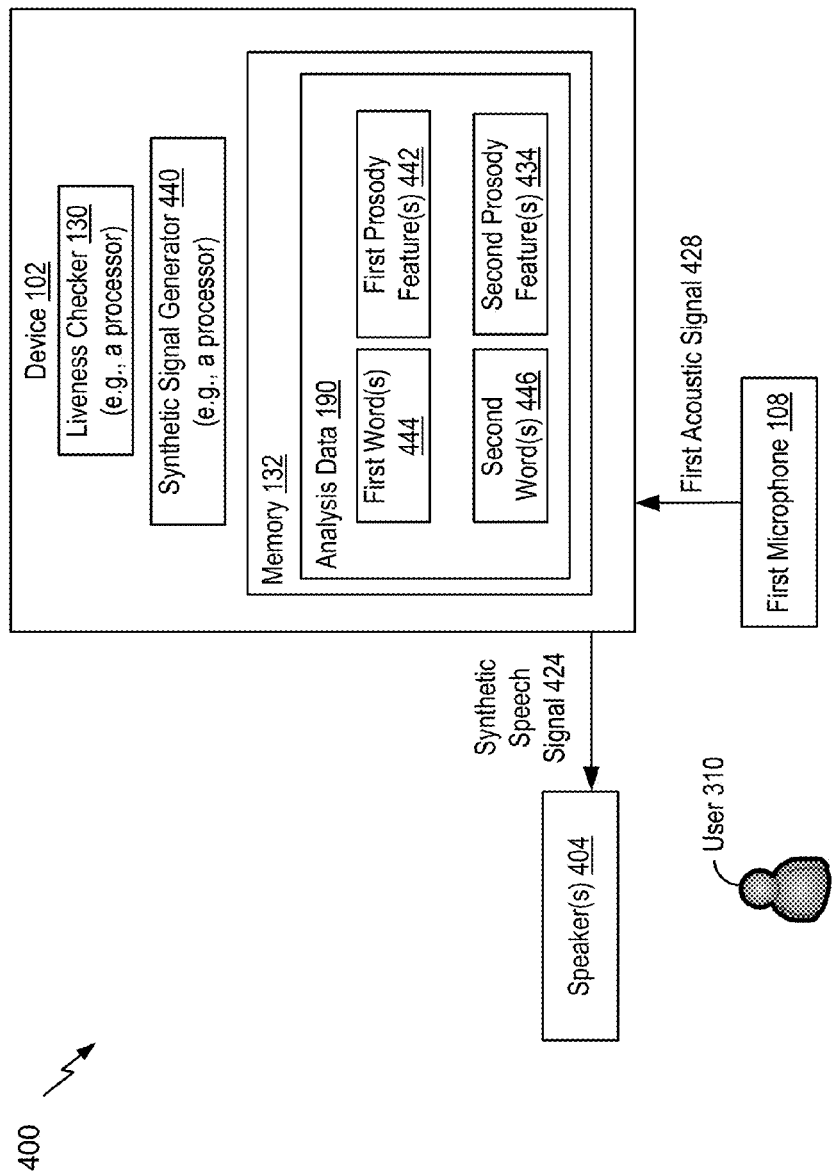
FIG. 4 is a diagram illustrating another particular aspect of a system configured to perform liveness determination based on sensor signals.

Referring to FIG. 4, a system is disclosed and generally designated 400. The system 400 may correspond to the system 100 of FIG. 1, the system 200 of FIG. 2, the system 300 of FIG. 1, or a combination thereof. The device 102 may include a synthetic signal generator 440. The device 102 may include one or more speakers 404. The synthetic signal generator 440 (e.g., a processor or a circuit) may be configured to generate a synthetic speech signal.

During operation, the synthetic signal generator 440 may perform speech synthesis to generate a synthetic speech signal 424 corresponding to one or more first words 444. The first words 444 may include one or more first prosody features 442. The first prosody features 442 may include at least one of loudness, duration, pause, or pitch. The liveness checker 130 may provide the synthetic speech signal 424 to the speakers 404. The liveness checker 130 may prompt the user 310 to repeat the first words 444. For example, the liveness checker 130 may provide a message to a display indicating that the user 310 is to reproduce sounds corresponding to the synthetic speech signal 424. In a particular aspect, the message may include text corresponding to the first words 444 and may indicate the first prosody features 442.

The device 102 may receive a first acoustic signal 428 via the first microphone 108. The first acoustic signal 428 may correspond to speech of the user 310. The liveness checker 130 may perform speech recognition to determine that the first acoustic signal 428 corresponds to one or more second words 446 and that the first acoustic signal 428 includes one or more second prosody features 434.

The liveness checker 130 may, in response to determining that a difference between the first acoustic signal 428 and the synthetic speech signal 424 fails to satisfy (e.g., is greater than) a difference threshold, provide the synthetic speech signal 424 to the speakers 404 again, provide another synthetic speech signal to the speakers 404, display an error message, determine that the first acoustic signal 428 does not correspond to a live user, or a combination thereof. In a particular implementation, the difference between the first acoustic signal 428 and the synthetic speech signal 424 may correspond to a difference between the first words 444 and the second words 446, a difference between the first prosody features 442 and the second prosody features 434, or both.

Alternatively, the liveness checker 130 may, in response to determining that the difference between the first acoustic signal 428 and the synthetic speech signal 424 satisfies (e.g., is less than or equal to) the difference threshold, generate the correlation score 134 of FIG. 1, the enrollment correlation score 234 of FIG. 2, the DOA data 344, the acoustic distortion data 342, the variations in DOA 346, the DOA correlation score 334 of FIG. 3, or a combination thereof. In a particular aspect, the liveness checker 130 may determine that the first acoustic signal 428 corresponds to a live user in response to determining that the difference between the first acoustic signal 428 and the synthetic speech signal 424 satisfies (e.g., is less than or equal to) the difference threshold.

In a particular implementation, the liveness checker 130 may, in response to determining that the first words 444 are the same as (or similar to) the second words 446 and that the first prosody features 442 are the same as (or similar to) the second prosody features 434, generate the correlation score 134 of FIG. 1, the enrollment correlation score 234 of FIG. 2, the DOA data 344, the acoustic distortion data 342, the variations in DOA 346, the DOA correlation score 334 of FIG. 3, or a combination thereof. In a particular aspect, the liveness checker 130 may determine that the first acoustic signal 428 corresponds to a live user in response to determining that the first words 444 are the same as (or similar to) the second words 446 and that the first prosody features 442 are the same as (or similar to) the second prosody features 434. The system 400 may thus enable determining liveness of the user 310 based on prosody features that may difficult to spoof in real-time.

Figure 5:
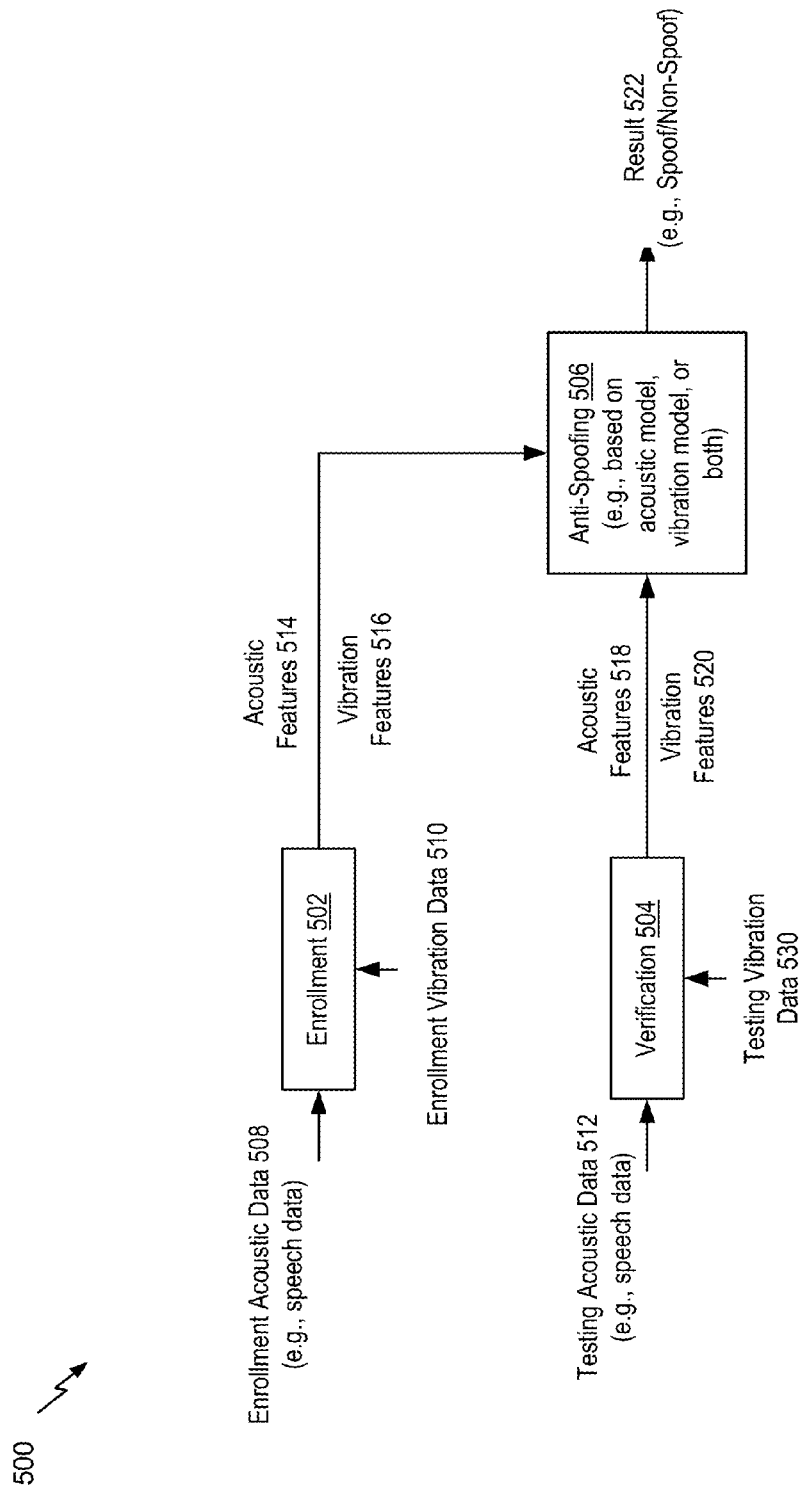
FIG. 5 is a diagram illustrating a particular method of liveness determination based on sensor signals.

Referring to FIG. 5, a method is shown and generally designated 500. The method 500 may be performed by at least one of the liveness checker 130, the authenticator 120, the device 102, the system 100 of FIG. 1, the enroller 220, or the system 200 of FIG. 2.

The method 500 includes performing enrollment, at 502. For example, the enroller 220 of FIG. 2 may, during an enrollment stage, receive (or access) enrollment acoustic data 508, enrollment vibration data 510, or both. The enrollment acoustic data 508, the enrollment vibration data 510, or both, may be associated with the user 210 of FIG. 2. For example, the enrollment acoustic data 508 may include the first acoustic signal 228 of FIG. 2. The enrollment vibration data 510 may include the first vibration signal 224, the second vibration signal 226 of FIG. 2, or both. The enroller 220 may generate acoustic features 514 based on the enrollment acoustic data 508. The enroller 220 may generate vibration features 516 based on the enrollment vibration data 510.

The enroller 220 may generate (or update) an anti-spoofing model based on the acoustic features 514, the vibration features 516, or both. The anti-spoofing model may include an acoustic model, a vibration model, or both. In a particular aspect, the liveness checker 130 may generate the enrollment correlation score 234, as described with reference to FIG. 2, based on the acoustic features 514, the vibration features 516, or both. The enroller 220 may generate (or update) the anti-spoofing model in response to determining that the enrollment correlation score 234 satisfies (e.g., is greater than) the enrollment threshold 236.

In a particular aspect, the enroller 220 may receive the enrollment data 118 from the user 210, as described with reference to FIG. 2. The enrollment data 118 may include non-acoustic data. For example, the enrollment data 118 may include at least one of an alphanumeric password, a finger print, an iris scan, or a facial image. The enroller 220 may store the enrollment data 118 in the memory 132 in response to determining that the enrollment correlation score 234 satisfies (e.g., is greater than) the enrollment threshold 236. The enrollment data 118, the acoustic features 514, the vibration features 516, or a combination thereof, may be associated with an authorized user (e.g., the user 210). For example, the enrollment data 118, the acoustic features 514, the vibration features 516, or a combination thereof, may be associated with (e.g., reference) an identifier (e.g., a user name) of the user 210.

The method 500 also includes performing verification, at 504. For example, the authenticator 120 of FIG. 1 may, during a testing stage, receive (or access) testing acoustic data 512, testing vibration data 530, or both. The testing acoustic data 512, the testing vibration data 530, or both, may be associated with the user 110 of FIG. 1. For example, the testing acoustic data 512 may include the first acoustic signal 128 of FIG. 1. The testing vibration data 530 may include the first vibration signal 124, the second vibration signal 126 of FIG. 1, or both. The liveness checker 130 may generate acoustic features 518 based on the testing acoustic data 512. The liveness checker 130 may generate vibration features 520 based on the testing vibration data 530.

In a particular aspect, the authenticator 120 of FIG. 1 may receive the authentication data 122, as described with reference to FIG. 1. The authenticator 120 may determine whether the user 110 is authenticated based on a comparison of the authentication data 122 and the enrollment data 118, as described with reference to FIG. 1. For example, the authenticator 120 may determine that the user 110 is authenticated in response to determining that the authentication data 122 (e.g., a password) matches the enrollment data 118 (e.g., a password associated with an authorized user). The liveness checker 130 may generate the acoustic features 518, the vibration features 520, or both, in response to determining that the user 110 is authenticated.

The method 500 further includes anti-spoofing, at 506. For example, the liveness checker 130 of FIG. 1 may generate the correlation score 134, as described with reference to FIG. 1, based on the acoustic features 518, the vibration features 520, or both. The liveness checker 130 may generate the threshold 136 based on the anti-spoofing model. For example, the liveness checker 130 may generate the threshold 136 by applying the acoustic features 518 to the anti-spoofing model. The threshold 136 may indicate a vibration measure, an acoustic-vibration correlation, a vibration-vibration correlation, or a combination thereof, corresponding to the user 210 when the acoustic features 518 are generated by the user 210.

The liveness checker 130 may generate a result 522 indicating whether the correlation score 134 satisfies the threshold 136. For example, a first value (e.g., a non-spoof value) of the result 522 may indicate that the correlation score 134 satisfies (e.g., is greater than or equal to) the threshold 136. A second value (e.g., a spoof value) of the result 522 may indicate that the correlation score 134 fails to satisfy (e.g., is less than) the threshold 136.

The liveness checker 130 may store the result 522 in the memory 132, may provide the result 522 to a display, or both. In a particular aspect, the liveness checker 130 may, in response to determining that the result 522 has the second value (e.g., a spoof value), determine that the user (e.g., the user 110) is not authorized, prompt the user 110 to provide additional information, disable access to the device 102 of FIG. 1, disable access to an application of the device 102, alert another device, or a combination thereof.

The method 500 may thus enable passive liveness testing that may be performed in the background during use of the device 102. For example, the liveness checker 130 may, during an enrollment stage, determine liveness of the user 210 based on the enrollment acoustic data 508, the enrollment vibration data 510, or both, received during general use of the device 102 without prompting the user 210 to provide the enrollment acoustic data 508, the enrollment vibration data 510, or both. The enrollment acoustic data 508, the enrollment vibration data 510, or both, may be received concurrently with the enrollment data 118. As another example, the liveness checker 130 may, during a testing stage, determine liveness of the user 110 based on the testing acoustic data 512, the testing vibration data 530, or both, received during general use of the device 102 without prompting the user 110 to provide the testing acoustic data 512, the testing vibration data 530, or both. The testing acoustic data 512, the testing vibration data 530, or both, may be received concurrently with the authentication data 122.

Figure 6:
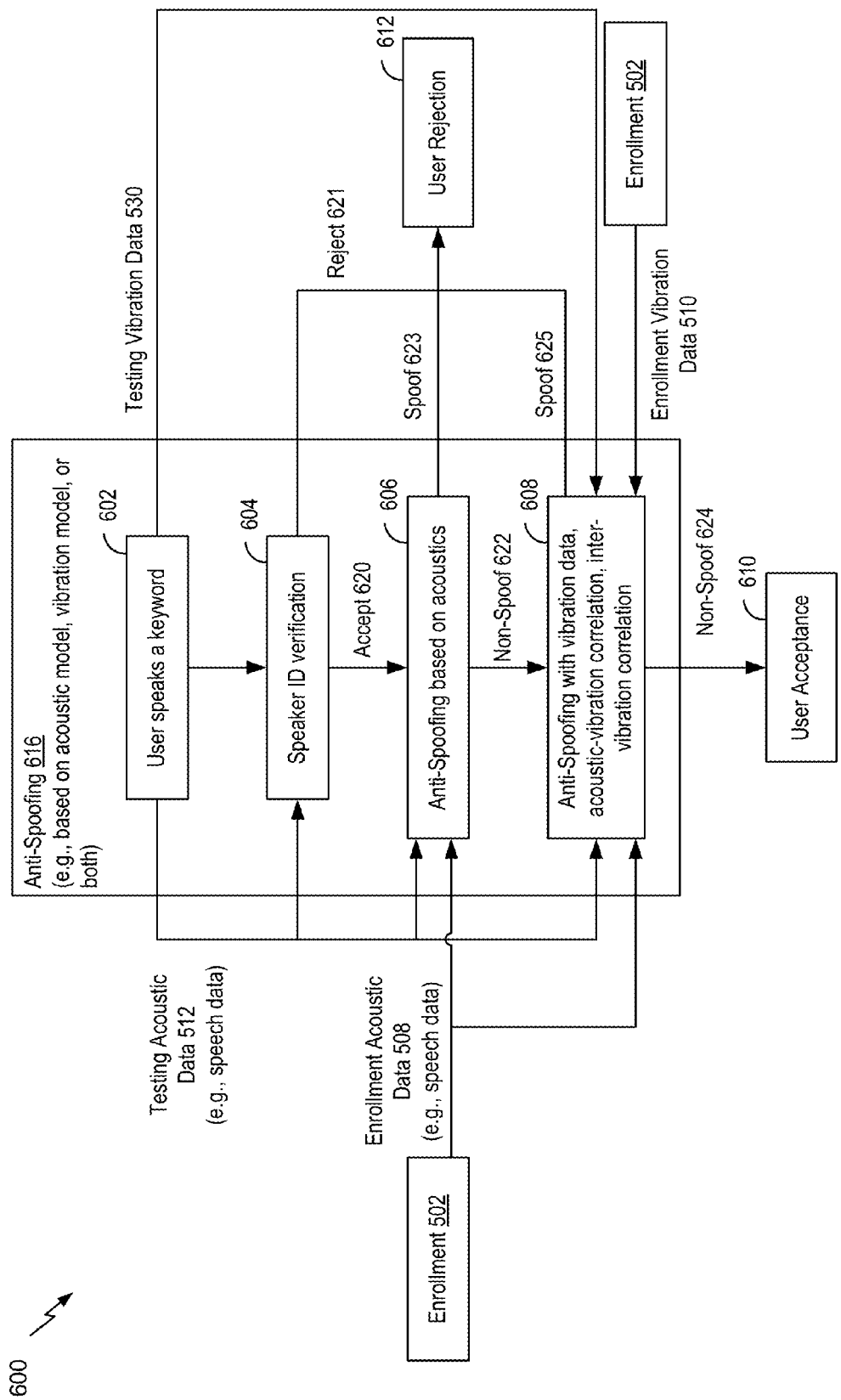
FIG. 6 is a diagram illustrating another particular method of liveness determination based on sensor signals.

Referring to FIG. 6, a method is shown and generally designated 600. The method 600 may be performed by at least one of the liveness checker 130, the authenticator 120, the device 102, the system 100 of FIG. 1, the enroller 220, the system 200 of FIG. 2, the acoustic distortion measurer 340, or the system 300 of FIG. 3.

The method 600 includes performing anti-spoofing, at 616. The anti-spoofing, at 616, may correspond to the verification, at 504 of FIG. 5, the anti-spoofing, at 506 of FIG. 5, or both.

The method 600 includes receiving, at 602, the testing acoustic data 512, the testing vibration data 530, or both. For example, the device 102 of FIG. 1, may receive the testing acoustic data 512, the testing vibration data 530, or both, as described with reference to FIG. 5. The testing acoustic data 512, the testing vibration data 530, or both, may be received concurrently with the user 110 speaking a keyword. The keyword may correspond to the authentication data 122 of FIG. 1.

The method 600 also includes speaker identification (ID) verification, at 604. For example, the authenticator 120 of FIG. 1 may determine whether the user 110 is authenticated based on a comparison of the enrollment data 118 and the authentication data 122, as described with reference to FIG. 1. The authenticator 120 may generate an accept value 620 in response to determining that the user 110 is authenticated. Alternatively, the authenticator 120 may generate a reject value 621 in response to determining that the user 110 is not authenticated. The method 600 may, in response to determining that the user 110 is not authenticated, at 604, proceed to 612.

The method 600 further includes, in response to determining that the user 110 is authenticated, at 604, performing anti-spoofing based on acoustics, at 606. For example, the liveness checker 130 of FIG. 1 may perform a first liveness determination based on the acoustic distortion data 342 and the acoustic distortion threshold 338 of FIG. 3, perform a second liveness determination based on the variations in DOA 346 and the variation threshold 348 of FIG. 3, perform a third liveness determination based on the DOA correlation score 334 and the DOA threshold 336 of FIG. 3, or a combination thereof, as described with reference to FIG. 3.

The acoustic distortion measurer 340 may generate the acoustic distortion data 342 based on the testing acoustic data 512. For example, the testing acoustic data 512 may include the first acoustic signal 128. The acoustic distortion data 342 may indicate a level of acoustic distortion in the first acoustic signal 128. The acoustic distortion measurer 340 may determine the acoustic distortion threshold 338 based on the enrollment acoustic data 508. The acoustic distortion threshold 338 may correspond to a level of acoustic distortion in the first acoustic signal 228. The enrollment acoustic data 508 may include the first acoustic signal 228.

The liveness checker 130 may generate the DOA data 344 of FIG. 3 based on a plurality of acoustic signals (e.g., the first acoustic signal 128 and a second acoustic signal), as described with reference to FIG. 3. The liveness checker 130 may determine the variations in DOA 346 of FIG. 3 based on the DOA data 344, as described with reference to FIG. 3. The liveness checker 130 may determine the variation threshold 348 based on the enrollment acoustic data 508. For example, the variation threshold 348 may correspond to variations in DOA associated with the enrollment acoustic data 508.

The liveness checker 130 may generate the DOA correlation score 334 indicating a correlation between the DOA indicated by the DOA data 344 and the first acoustic signal 128, as described with reference to FIG. 3. The liveness checker 130 may determine the DOA threshold 336 based on the enrollment acoustic data 508. For example, the DOA threshold 336 may correspond to a correlation between the DOA associated with the enrollment acoustic data 508 and the first acoustic signal 228.

The liveness checker 130 may perform a model-based determination based on the enrollment acoustic data 508, the testing acoustic data 512, or both, as further described with reference to FIG. 7. The liveness checker 130 may perform one or more determinations of the first liveness determination, the second liveness determination, the third liveness determination, or the model-based determination. The liveness checker 130 may, in response to determining that at least one of the one or more determinations is unsuccessful, generate a spoof value 623. The method 600 may proceed to 612. The liveness checker 130 may, in response to determining that all of the one or more determinations are successful, generate a non-spoof value 622.

The method 600 also includes, in response to determining that all of the one or more determinations are successful, at 606, performing anti-spoofing, at 608. For example, the liveness checker 130 may determine the correlation score 134 based on the testing acoustic data 512, the testing vibration data 530, or both, as described with reference to FIG. 5. The liveness checker 130 may determine the threshold 136 based on the enrollment acoustic data 508, the enrollment vibration data 510, or both, as described with reference to FIG. 5.

The liveness checker 130 may determine that the user 110 is authorized based on a comparison of the correlation score 134 and the threshold 136, as described with reference to FIG. 1. The liveness checker 130 may generate a spoof value 625 in response to determining that the user 110 is not authorized. The method 600 may proceed to 612. The liveness checker 130 may, in response to determining that the user 110 is authorized, at 608, generate a non-spoof value 624.

The method 600 further includes, in response to determining that the user 110 is authorized, at 608, performing user acceptance, at 610. For example, the liveness checker 130 may, in response to determining that the user 110 is authorized, enable access to the device 102, an application of the device 102, a remote application, protected data, or a combination thereof.

The method 600 also includes performing user rejection, at 612. For example, the liveness checker 130 may disable access to the device 102, an application of the device 102, a remote application, protected data, or a combination thereof. In a particular aspect, the liveness checker may prompt the user 110 to provide additional information, alert another device, or both.

The method 600 may thus enable passive liveness testing that may be performed in the background during use of the device 102. For example, the liveness checker 130 may determine liveness of the user 110 based on the testing acoustic data 512 during general use of the device 102 without prompting the user 110 to provide the testing acoustic data 512.

Figure 7:
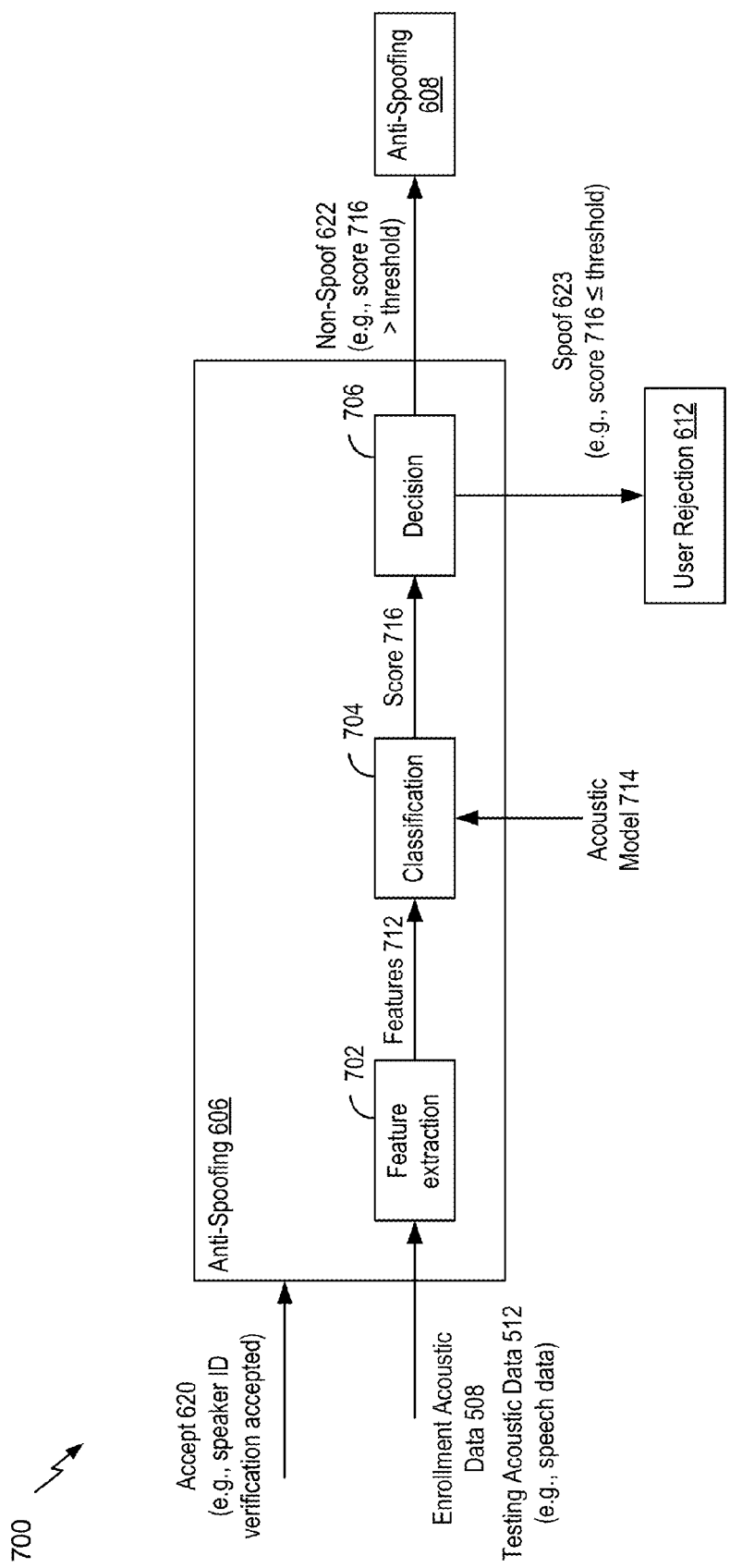
FIG. 7 is a diagram illustrating another particular method of liveness determination based on sensor signals.

Referring to FIG. 7, a method is shown and generally designated 700. The method 700 may be performed by at least one of the liveness checker 130, the authenticator 120, the device 102, the system 100 of FIG. 1, the enroller 220, the system 200 of FIG. 2, the acoustic distortion measurer 340, or the system 300 of FIG. 3. The method 700 includes performing anti-spoofing, at 606.

The method 700 includes feature extraction, at 702. For example, the liveness checker 130 of FIG. 1 may determine features 712 based on the enrollment acoustic data 508, the testing acoustic data 512, or both. To illustrate, the liveness checker 130 may determine enrollment acoustic features of the enrollment acoustic data 508, testing acoustic features of the testing acoustic data 512, or both. The features 712 may include the enrollment acoustic features, the testing acoustic features, or both.

The method 700 also includes classification, at 704. For example, the liveness checker 130 may generate a score 716 based on the features 712 and an acoustic model 714. To illustrate, the enroller 220 may update (or generate) the acoustic model 714 based on the enrollment acoustic features. The liveness checker 130 may generate the score 716 based on the testing acoustic features and the acoustic model 714. For example, the score 716 may indicate a likelihood (e.g., a probability) that the testing acoustic features correspond to acoustic features (e.g., the enrollment acoustic features) modelled by the acoustic model 714. To illustrate, the score 716 may indicate a likelihood (e.g., a probability) that the first acoustic signal 128 corresponds to the voice of the same person as the first acoustic signal 228.

The method 700 further includes making a decision, at 706. For example, the liveness checker 130 may, in response to determining that the score 716 satisfies (e.g., is greater than) a threshold, generate the non-spoof value 622. The method 700 may proceed to 608. As another example, the liveness checker 130 may, in response to determining that the score 716 fails to satisfy (e.g., is less than or equal to) the threshold, generate the spoof value 623. The method 700 may proceed to 612.

The method 700 may thus enable the liveness checker 130 to perform a preliminary acoustic-based anti-spoofing determination. The liveness checker 130 may perform a vibration-based anti-spoofing determination in cases where the acoustic-based anti-spoofing determination is successful.

Figure 8:
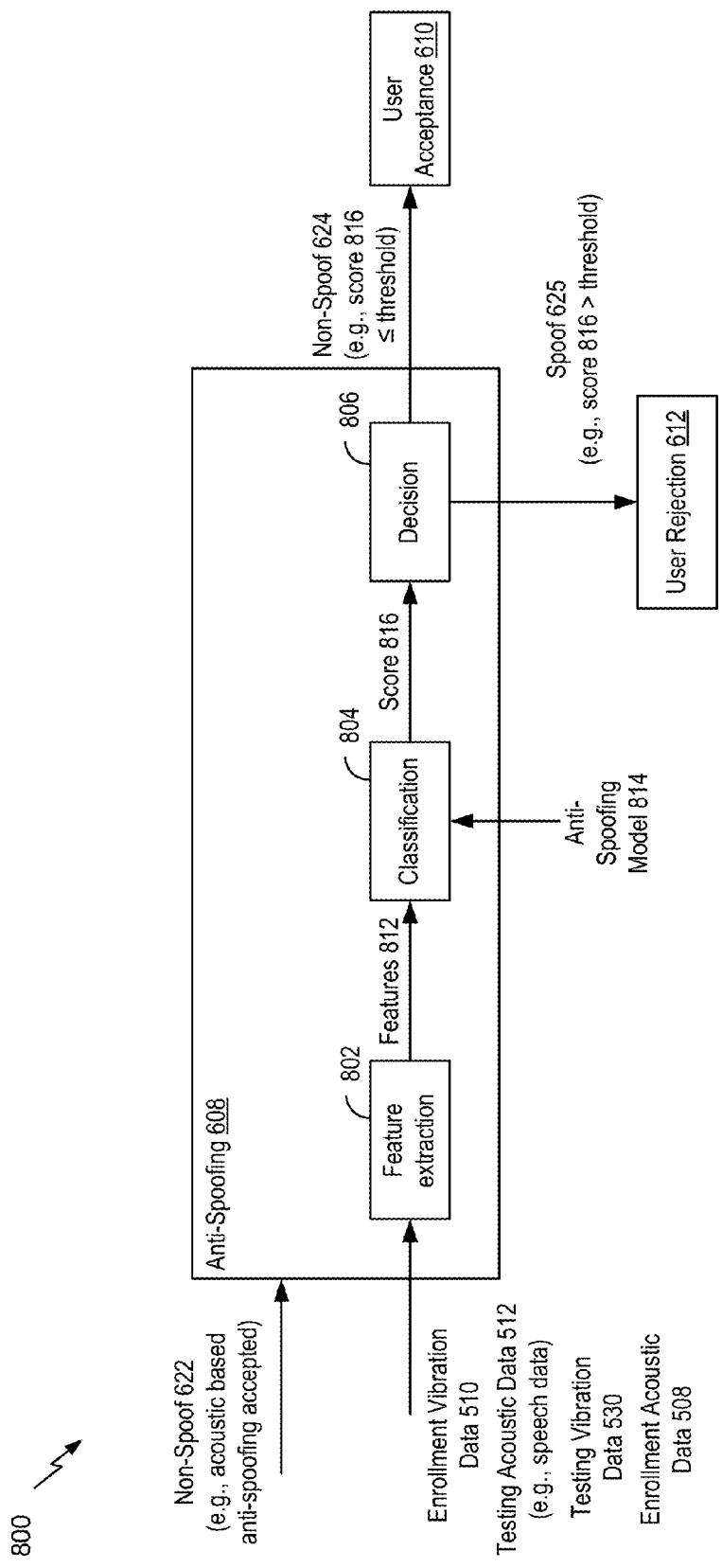
FIG. 8 is a diagram illustrating another particular method of liveness determination based on sensor signals.

Referring to FIG. 8, a method is disclosed and generally designated 800. The method 800 may be performed by at least one of the liveness checker 130, the authenticator 120, the device 102, the system 100 of FIG. 1, the enroller 220, the system 200 of FIG. 2, the acoustic distortion measurer 340, or the system 300 of FIG. 3. The method 800 includes performing anti-spoofing, at 608.

The method 800 includes feature extraction, at 802. For example, the liveness checker 130 of FIG. 1 may determine features 812 based on the enrollment acoustic data 508, the enrollment vibration data 510, the testing acoustic data 512, the testing vibration data 530, or a combination thereof. To illustrate, the liveness checker 130 may determine enrollment acoustic features based on the enrollment acoustic data 508, enrollment vibration features based on the enrollment vibration data 510, testing acoustic features based on the testing acoustic data 512, testing vibration features based on the testing vibration data 530, or a combination thereof. The features 812 may include the enrollment acoustic features, the enrollment vibration features, the testing acoustic features, the testing vibration features, or a combination thereof.

The method 800 also includes classification, at 804. For example, the liveness checker 130 may generate a score 816 based on the features 812 and an anti-spoofing model 814. To illustrate, the enroller 220 may update (or generate) the anti-spoofing model 814 based on the enrollment acoustic features, the enrollment vibration features, or both. The liveness checker 130 may determine the correlation score 134, as described with reference to FIG. 1, based on the testing acoustic features, the testing vibration features, or both. The correlation score 134 may indicate a vibration measure, an acoustic-vibration correlation score, a vibration-vibration correlation score, or a combination thereof, as described with reference to FIG. 1. The liveness checker 130 may determine the threshold 136 based on the testing acoustic features and the anti-spoofing model 814. The liveness checker 130 may determine the score 816 based on the correlation score 134 and the threshold 136 (e.g., the score 816=|the correlation score 134−the threshold 136|).

The method 800 further includes making a decision, at 806. For example, the liveness checker 130 may, in response to determining that the score 816 satisfies (e.g., is less than or equal to) the threshold, generate the non-spoof value 624.

The method 800 may proceed to 610. As another example, the liveness checker 130 may, in response to determining that the score 816 fails to satisfy (e.g., is greater than) the threshold, generate the spoof value 625. The method 800 may proceed to 612.

In a particular implementation, the score 816 may correspond to a correlation score (e.g., the correlation score 134) indicating a correlation between the testing acoustic features, the testing vibration features, or both, and features (e.g., the enrollment acoustic features, the enrollment vibration features, or both) of the anti-spoofing model 814. In this implementation, the liveness checker 130 may generate the non-spoof value 624 in response to determining that the correlation score (e.g., the correlation score 134) satisfies (e.g., is greater than or equal to) a threshold (e.g., the threshold 136). Alternatively, the liveness checker 130 may, in response to determining that the correlation score (e.g., the correlation score 134) fails to satisfy (e.g., is less than) the threshold (e.g., the threshold 136), generate the spoof value 625.

The method 800 thus enables passive liveness testing that may be performed in the background during use of the device 102. The liveness checker 130 may perform model-based anti-spoofing using acoustic data, vibration data, or both.

Figure 9:
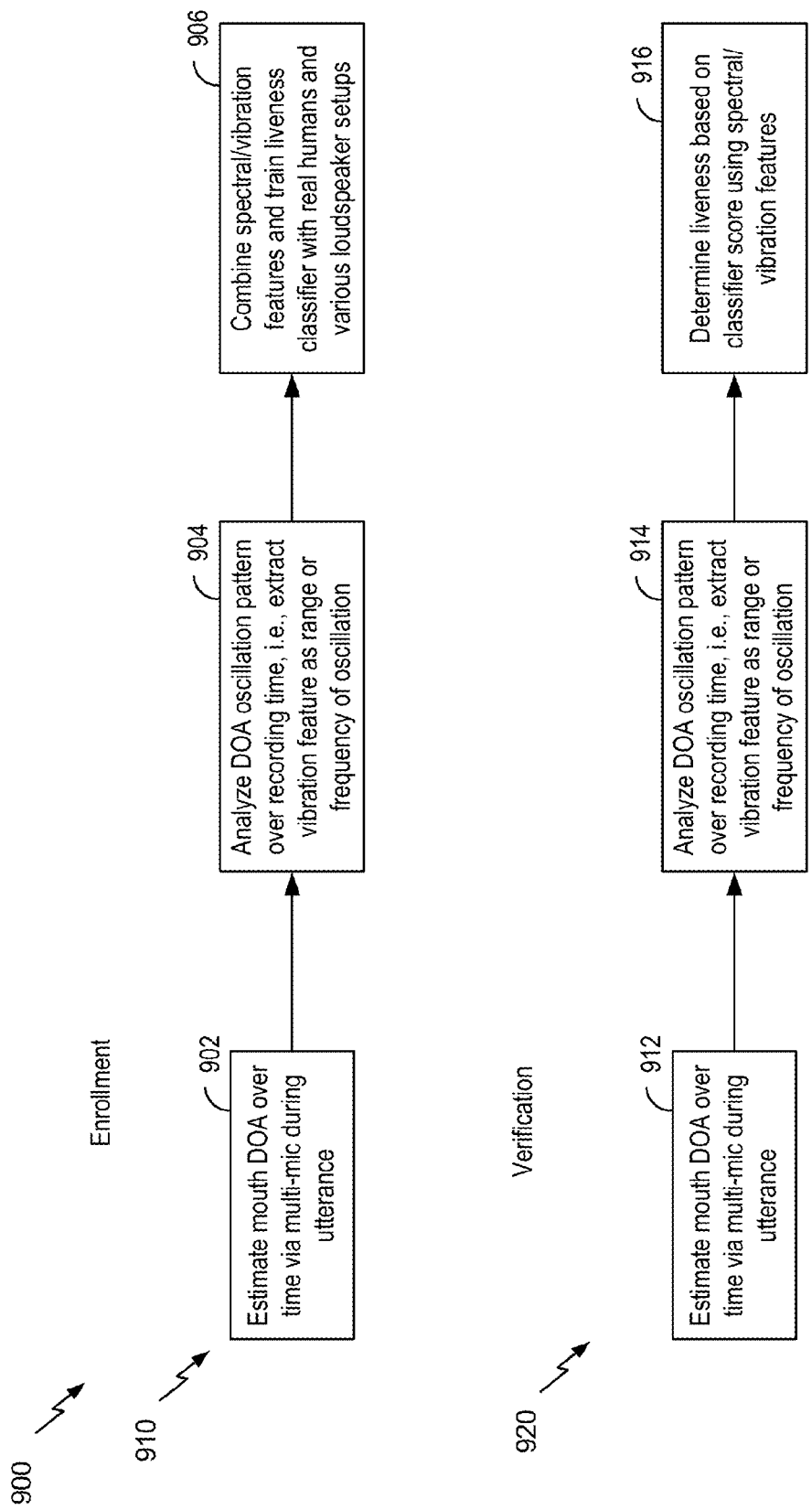
FIG. 9 is a diagram illustrating another particular method of liveness determination based on sensor signals.

Referring to FIG. 9, a diagram is shown and generally designated 900. The diagram 900 illustrates a method 910 and a method 920. The method 910, the method 920, or both, may be performed by at least one of the liveness checker 130, the authenticator 120, the device 102, the system 100 of FIG. 1, the enroller 220, the system 200 of FIG. 2, the acoustic distortion measurer 340, or the system 300 of FIG. 3. The method 910 may be performed during an enrollment stage. The method 920 may be performed during a testing (e.g., verification) stage.

The method 910 includes estimating mouth DOA over time via multiple microphones (mic) during utterance, at 902. For example, the liveness checker 130 may generate enrollment DOA data (e.g., the DOA data 344) based on the first acoustic signal 328 received via the first microphone 108 and the second acoustic signal 330 received via the second microphone 312, as described with reference to FIG. 3. The first acoustic signal 328, the second acoustic signal 330, or both, may be received while the user 310 (e.g., the user 210 of FIG. 2) is speaking.

The method 910 also includes analyzing DOA oscillation pattern over recording time, at 904. For example, the liveness checker 130 may generate enrollment variations in DOA (e.g., the variations in DOA 346 of FIG. 3) based on the enrollment DOA data (e.g., the DOA data 344), as described with reference to FIG. 3. The enrollment variations in DOA (e.g., the variations in DOA 346) may correspond to vibration features as a range of DOA oscillation, a frequency of DOA oscillation, or both.

The method 910 further includes combining spectral and/or vibration features and training a liveness classifier with humans and various loudspeaker setups, at 906. For example, the liveness checker 130 may generate (or update) an anti-spoofing model (e.g., a classifier) based on the enrollment variations in DOA (e.g., the variations in DOA 346) and enrollment acoustic features of the first acoustic signal 328, the second acoustic signal 330, or both. To illustrate, the anti-spoofing model (e.g., the anti-spoofing model 814) may indicate a correlation between the enrollment variations in DOA (e.g., the variations in DOA 346) and the enrollment acoustic features.

The method 920 includes estimating mouth DOA over time via multiple microphones (mic) during utterance, at 912. For example, the liveness checker 130 may generate testing DOA data (e.g., the DOA data 344) based on the first acoustic signal 328 received via the first microphone 108 and the second acoustic signal 330 received via the second microphone 312, as described with reference to FIG. 3. The first acoustic signal 328, the second acoustic signal 330, or both, may be received while the user 310 (e.g., the user 110 of FIG. 1) is speaking.

The method 920 also includes analyzing DOA oscillation pattern over recording time, at 914. For example, the liveness checker 130 may generate testing variations in DOA (e.g., the variations in DOA 346 of FIG. 3) based on the testing DOA data (e.g., the DOA data 344), as described with reference to FIG. 3. The testing variations in DOA (e.g., the variations in DOA 346) may correspond to vibration features as a range of DOA oscillation, a frequency of DOA oscillation, or both.

The method 920 includes determining liveness based on a classifier score using spectral and/or vibration features, at 916. For example, the liveness checker 130 may generate a classifier score (e.g., the correlation score 134 of FIG. 1 or the score 816 of FIG. 8) based on the testing acoustic features, the testing variations in DOA, the anti-spoofing model (e.g., a classifier), or a combination thereof. The liveness checker 130 may determine liveness based on a comparison of the classifier score (e.g., the correlation score 134 or the score 816) and a threshold. For example, the liveness checker 130 may determine that the first acoustic signal 328 (e.g., the first acoustic signal 128 of FIG. 1) corresponds to a live user in response to determining that the classifier score (e.g., the correlation score 134 or the score 816) satisfies the threshold.

The methods 910 and 920 thus enable passive liveness determination during use of the device 102 of FIG. 1. The liveness determination may be based on DOA of acoustic signals.

Figure 10:
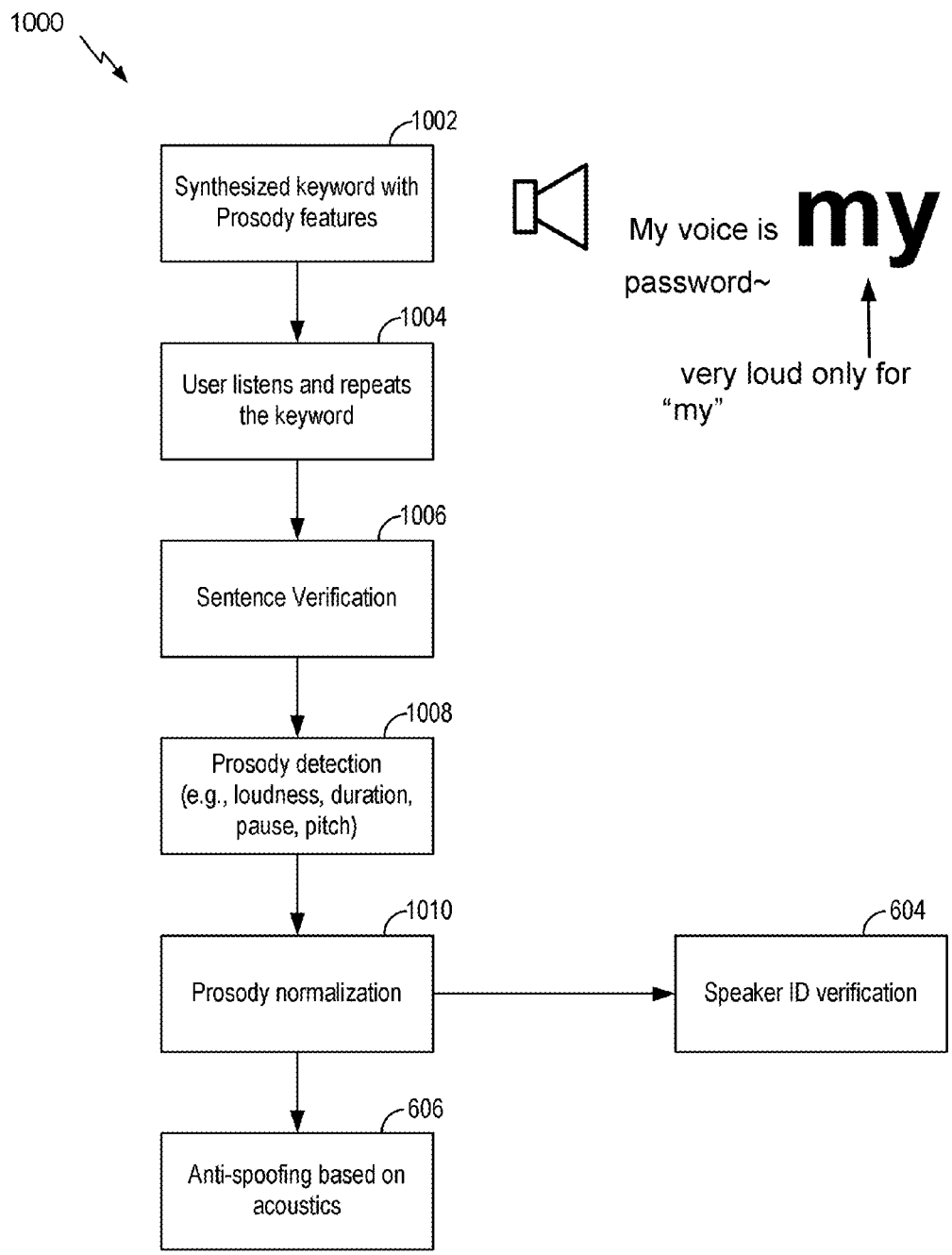
FIG. 10 is a diagram illustrating another particular method of liveness determination based on sensor signals.

Referring to FIG. 10, a method is shown and generally designated 1000. The method 1000 may be performed by at least one of the liveness checker 130, the authenticator 120, the device 102, the system 100 of FIG. 1, the enroller 220, the system 200 of FIG. 2, the acoustic distortion measurer 340, the system 300 of FIG. 3, the synthetic signal generator 440, or the system 400 of FIG. 4.

The method 1000 includes generating a synthesized keyword with prosody features, at 1002. For example, the synthetic signal generator 440 of FIG. 4 may generate the synthetic speech signal 424 corresponding to the first words 444 (e.g., a keyword). The first words 444 may include the first prosody features 442. The liveness checker 130 may provide the synthetic speech signal 424 to the speakers 404.

The method 1000 also includes receiving an acoustic signal, at 1004. The acoustic signal may correspond to a user listening to the synthetic speech signal 424 and attempting to repeat the first words 444. For example, the liveness checker 130 may receive the first acoustic signal 428, as described with reference to FIG. 4. The first acoustic signal 428 may correspond to the user 310 listening to an output (e.g., the synthetic speech signal 424) of the speakers 404 and attempting to repeat the first words 444.

The method 1000 further includes sentence verification, at 1006. For example, the liveness checker 130 of FIG. 1 may determine that the first acoustic signal 428 corresponds to the second words 446, as described with reference to FIG. 4. The liveness checker 130 may determine whether the second words 446 match the first words 444. For example, the liveness checker 130 may determine that the second words 446 match the first words 444 in response to determining that the second words 446 include at least a threshold number of the first words 444 or of words that sound similar to the first words 444.

The method 1000 also includes prosody detection, at 1008. For example, the liveness checker 130 may, in response to determining that the second words 446 match the first words 444, at 1006, determine that the first acoustic signal 428 includes the second prosody features 434 (e.g., loudness, duration, pause, pitch, or a combination thereof). The liveness checker 130 may determine whether the second prosody features 434 match the first prosody features 442. For example, the liveness checker 130 may determine that the second prosody features 434 match the first prosody features 442 in response to determining that the second prosody features 434 include at least a threshold number of the first prosody features 442.

The method 1000 further includes prosody normalization, at 1010. For example, the liveness checker 130 may perform prosody normalization on the first acoustic signal 428. To illustrate, the liveness checker 130 may generate the first acoustic signal 128 (or the first acoustic signal 228) by performing the prosody normalization on the first acoustic signal 428. The method 1000 may proceed to 604. In an alternate implementation, the method 1000 may proceed to 606. The method 1000 thus enables determining liveness of a user (e.g., the user 310) based on prosody features that may be difficult to spoof in real-time.

Figure 11:
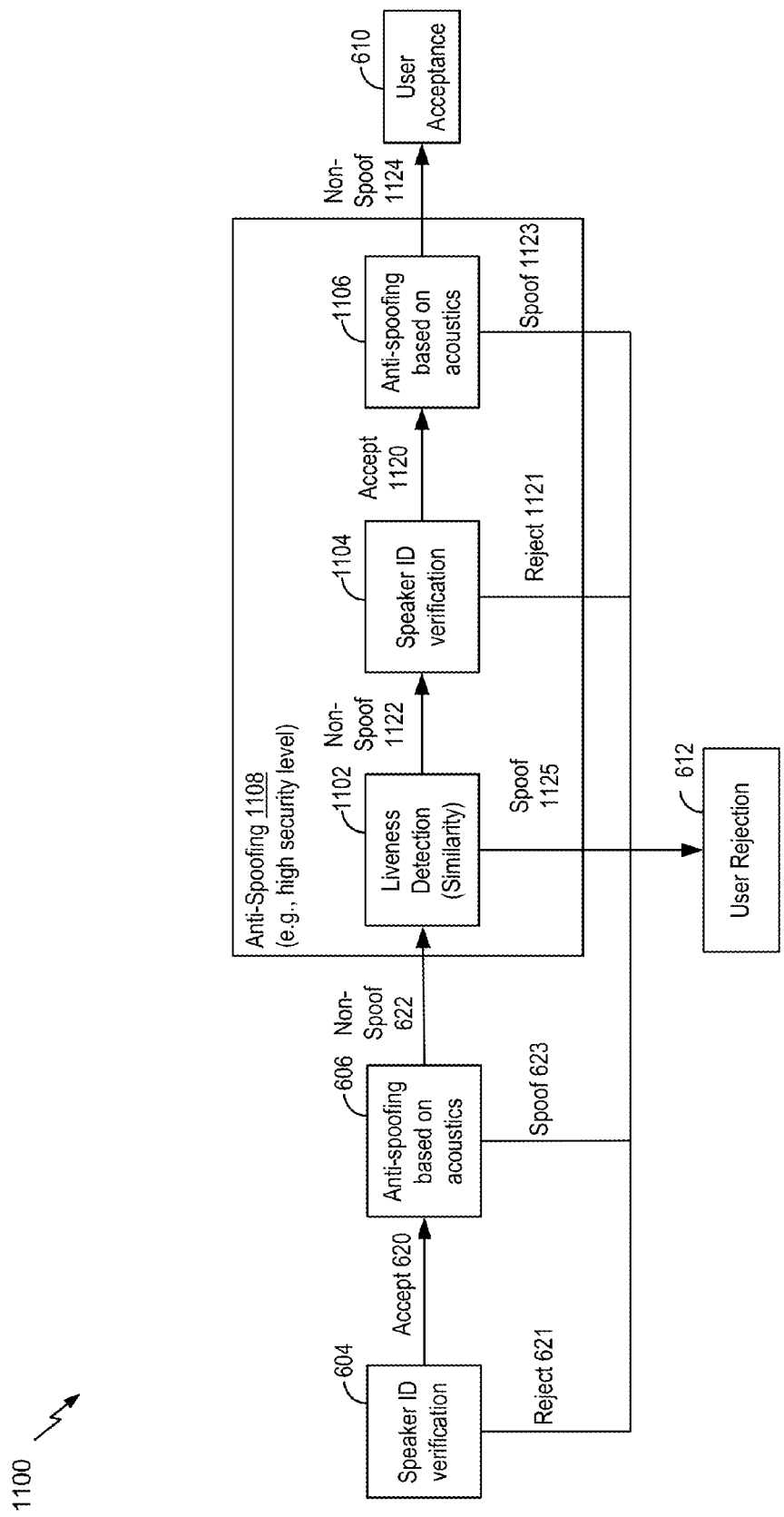
FIG. 11 is a diagram illustrating another particular method of liveness determination based on sensor signals.

Referring to FIG. 11, a method is shown and generally designated 1100. The method 1100 may be performed by at least one of the liveness checker 130, the authenticator 120, the device 102, the system 100 of FIG. 1, the enroller 220, the system 200 of FIG. 2, the acoustic distortion measurer 340, the system 300 of FIG. 3, the synthetic signal generator 440, or the system 400 of FIG. 4. The method 1100 includes, in response to generating the non-spoof value 622, at 606, performing anti-spoofing, at 1108.

The method 1100 includes liveness detection, at 1102. For example, the liveness checker 130 of FIG. 1 may, during a particular security mode (e.g., a high security mode), prompt the user 110 to provide same information again. To illustrate, the enrollment data 118 may include a first enrolled keyword. The authentication data 122 may include the first keyword. For example, the authenticator 120 may determine the first keyword by performing language recognition on the testing acoustic data 512 (e.g., the first acoustic signal 128). The authenticator 120 may determine that the user 110 is authenticated, as described with reference to 604 of FIG. 6, in response to determining that the first keyword matches (e.g., is substantially similar to) the first enrolled keyword.

The liveness checker 130 may, in response to generating the non-spoof value 622, at 606, prompt the user 110 to provide the first enrolled keyword again. The liveness checker 130 may receive a particular acoustic signal subsequent to prompting the user 110. The liveness checker 130 may generate a first particular keyword by performing language recognition on the acoustic signal. The liveness checker 130 may perform a liveness determination based on a comparison of the first acoustic signal 128 and the particular acoustic signal. For example, the liveness checker 130 may, in response to determining that the first particular keyword matches the first keyword, generate a similarity score indicating a level of similarity between the first acoustic signal 128 and the particular acoustic signal. A similarity score that satisfies (e.g., is greater than) a similarity threshold may indicate replay spoofing. For example, during replay spoofing, the particular acoustic signal may be more similar (e.g., identical) to the first acoustic signal 128 than if the particular acoustic signal is generated by a live user. The liveness checker 130 may generate a spoof value 1125 in response to determining that the similarity score satisfies (e.g., is greater than) the similarity threshold. The method 1100 may proceed to 612. As another example, the liveness checker 130 may, in response to determining that the similarity score fails to satisfy (e.g., is less than or equal to) the similarity threshold, generate a non-spoof value 1122.

The method 1100 also includes speaker ID verification, at 1104. For example, the enrollment data 118 may include multiple keywords (e.g., the first enrolled keyword and a second enrolled keyword). The liveness checker 130 may prompt the user 110 to provide the second enrolled keyword. The liveness checker 130 may receive a second testing acoustic signal subsequent to prompting the user 110. The liveness checker 130 may generate a second keyword by performing language recognition on the second testing acoustic signal. The liveness checker 130 may perform a liveness determination based on a comparison of the second keyword and the second enrolled keyword. For example, the liveness checker 130 may generate a reject value 1121 in response to determining that the second keyword does not match the second enrolled keyword. The method 1100 may proceed to 612. As another example, the liveness checker 130 may, in response to determining that the second keyword matches (e.g., is substantially similar to) the second enrolled keyword, generate an accept value 1120.

The method 1100 further includes performing anti-spoofing based on acoustics, at 1106. For example, the liveness checker 130 may perform acoustics-based anti-spoofing, as described with reference to 606 of FIG. 6, using the second testing acoustic signal. To illustrate, the liveness checker 130 may perform one or more determinations, as described with reference to 606 of FIG. 6. The liveness checker 130 may generate a spoof value 1123 in response to determining that at least one of the one or more determinations is unsuccessful. The method 1100 may proceed to 612. Alternatively, the liveness checker 130 may, in response to determining that all of the one or more determinations are successful, generate a non-spoof value 1124. The method 1100 may proceed to 610. In an alternative implementation, the method 100 may, in response to determining that all of the one or more determinations are successful, at 1106, proceed to 608.

The method 1100 thus enables high security level anti-spoofing protection. During a high security mode, the liveness checker 130 may detect replay spoofing by prompting for a user to provide the same keyword again. In addition, or in the alternative, the liveness checker 130 may prompt a user to provide a randomly selected enrollment keyword. Recordings of multiple enrollment keywords may be less likely to be compromised than a recording of a single enrollment keyword.

Figure 12:
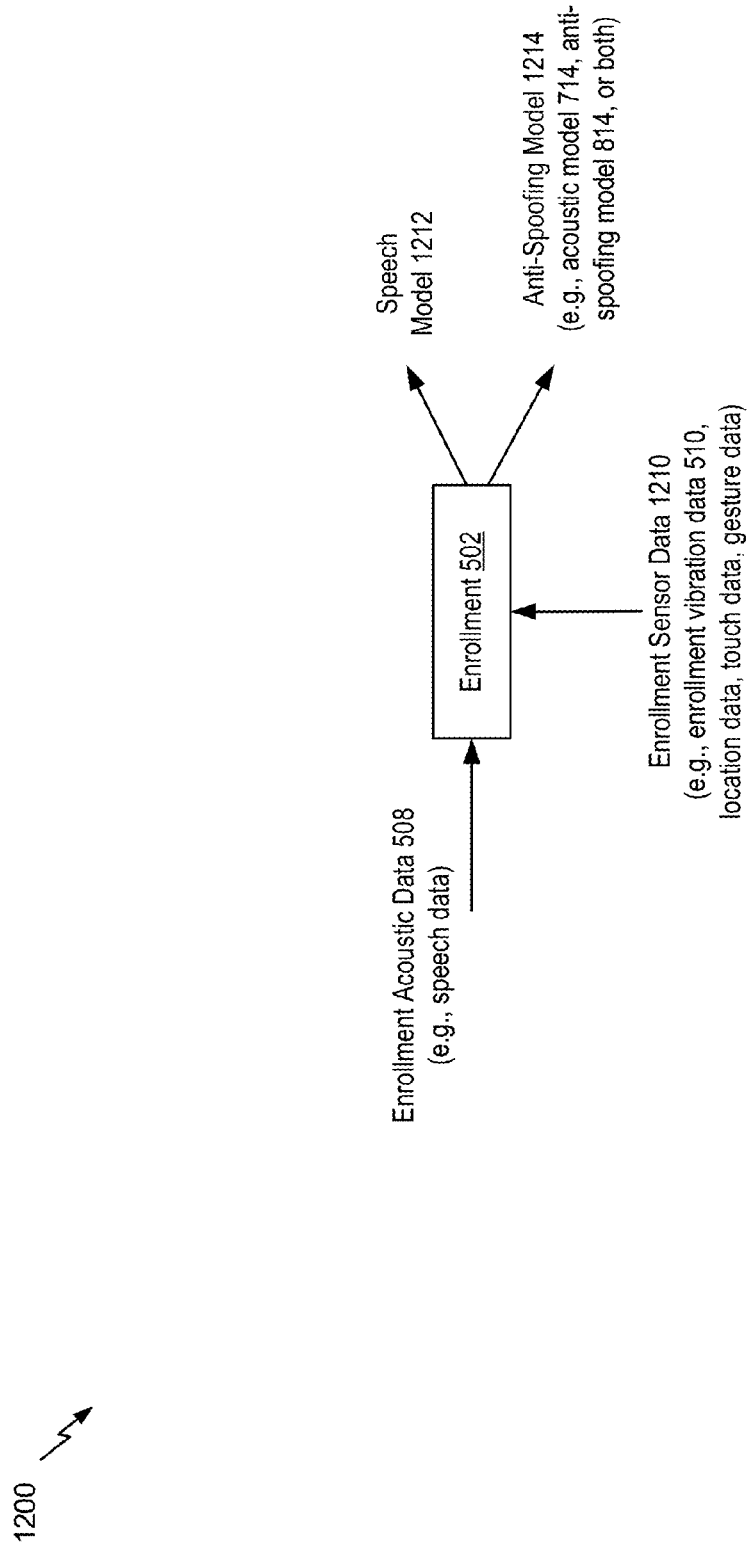
FIG. 12 is a diagram illustrating another particular method of liveness determination based on sensor signals.

Referring to FIG. 12, a method is shown and generally designated 1200. The method 1200 may be performed by at least one of the device 102, the system 100 of FIG. 1, the enroller 220, or the system 200 of FIG. 2.

The method 1200 includes performing enrollment, at 502. For example, the enroller 220 may generate a speech model 1212, an anti-spoofing model 1214, or both, based on the enrollment acoustic data 508, enrollment sensor data 1210, or both. The enrollment sensor data 1210 may include the enrollment vibration data 510, location data, touch data, gesture data, or a combination thereof. The location data may indicate a location (e.g., coordinates, geographical location, city, state, address, building, point of interest, or a combination thereof) of the device 102 at a first time at which the first acoustic signal 228 of FIG. 2 is received. Touch data may include data (e.g., an optical image or sound data) corresponding to at least a portion of a finger print or a hand print. The gesture data may indicate one or more gestures of the user 210 at approximately the first time. For example, the device 102 may receive image data via a camera and may determine the gesture data by performing gesture recognition on the image data. The touch data, the gesture data, or both, may be generated concurrently with receiving the first acoustic signal 228.

The anti-spoofing model 1214 may include the acoustic model 714, the anti-spoofing model 814, or both. The enroller 220 may, during an enrollment stage, extract acoustic features from the enrollment acoustic data 508. The enroller 220 may update (or generate) the speech model 1212 based on the acoustic features. The enroller 220 may extract vibration features from the enrollment vibration data 510, location features from the location data, touch features from the touch data, gesture features from the gesture data, or a combination thereof. The enroller 220 may update (or generate) the anti-spoofing model 1214 based on the acoustic features, the vibration features, the location features, the touch features, the gesture features, or a combination thereof.

The liveness checker 130 of FIG. 1 may, during a testing stage, receive the testing acoustic data 512, testing sensor data (e.g., the testing vibration data 530, testing location data, testing touch data, testing gesture data, or a combination thereof), or a combination thereof. The liveness checker 130 may extract testing features from the testing acoustic data 512, the testing sensor data, or both. For example, the liveness checker 130 may determine testing acoustic features of testing acoustic data 512, testing vibration features of the testing vibration data 530, testing location features of the testing location data, testing touch features of the testing touch data, testing gestures features of the testing gesture data, or a combination thereof. The liveness checker 130 may determine an acoustic classification score (e.g., the score 716 of FIG. 7) based on the testing acoustic features and the speech model 1212. The liveness checker 130 may determine an anti-spoofing classification score (e.g., the score 816 of FIG. 8) based on the anti-spoofing model 1214 and the testing features (e.g., the testing acoustic features, the testing vibration features, the testing location features, the testing touch features, the testing gestures features, or a combination thereof).

The method 1200 may thus enable passive liveness determination to be performed based on an anti-spoofing model. The anti-spoofing model may be generated (or updated) during an enrollment stage and may be used to perform anti-spoofing during a testing stage.

Figure 13:
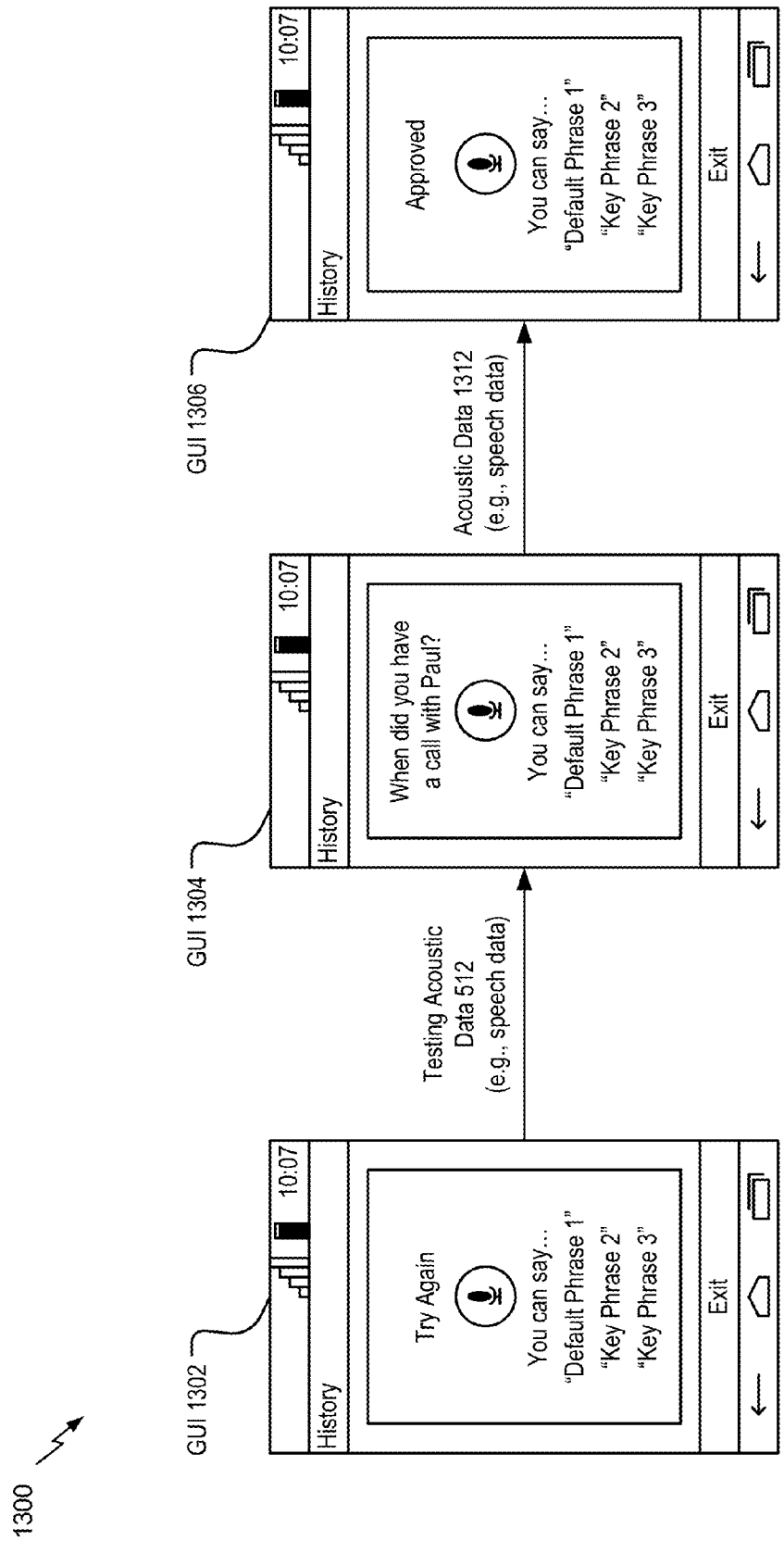
FIG. 13 is a diagram illustrating graphical user interfaces that may be generated by the systems of FIGS. 1-4.

Referring to FIG. 13, a diagram is shown and generally designated 1300. The diagram 1300 includes a graphical user interface (GUI) 1302, a GUI 1304, and a GUI 1306. One or more of the GUIs 1302-1306 may be generated by one or more of the systems of FIGS. 1-4.

The liveness checker 130 may provide the GUI 1302 to a display of the device 102 in response to receiving a user input indicating an authorization request. The enrollment data 118 may include one or more enrollment keywords. The GUI 1302 may prompt the user 110 of FIG. 1 to say at least one of the one or more enrollment keywords. The liveness checker 130 may, subsequent to providing the GUI 1302 to the display, receive the first acoustic signal 128 of FIG. 1. The liveness checker 130 may generate the testing acoustic data 512 based on the first acoustic signal 128.

The liveness checker 130 may, subsequent to receiving the first acoustic signal 128, provide the GUI 1304 to the display. For example, the liveness checker 130 may generate a first particular keyword by performing language recognition on the first acoustic signal 128. In a particular aspect, the liveness checker 130 may generate the GUI 1304 in response to determining that the first particular keyword does not match any of the one or more enrollment keywords.

In a particular aspect, the liveness checker 130 may generate the GUI 1304 in response to determining that the testing acoustic data 512 does not correspond to a live user. For example, the liveness checker 130 may, in response to determining that the first particular keyword matches at least one of the one or more enrollment keywords, determine the correlation score 134 based on the testing acoustic data 512, the testing vibration data 530, or both, as described with reference to FIG. 5. The liveness checker 130 may generate the GUI 1304 in response to determining that the correlation score 134 fails to satisfy the threshold 136.

The GUI 1304 may prompt the user 110 to provide additional information. For example, the device 102 may store user data, such as call data, location data, appointment data, or a combination thereof. Call data may indicate one or more outgoing call times at which calls are made to contacts from the device 102, one or more incoming call times at which calls are received by the device 102, or both. Location data may indicate times at which the device 102 was at various locations. Appointment data may indicate appointments stored in a calendar of the device 102. The appointments may include at least one of a past appointment, a present appointment, or a future appointment. The GUI 1304 may include a question (e.g., a time at which a call was made to a particular contact, a time at which the device 102 was at a location, a particular location of the device 102 at a particular time, an appointment time of a particular appointment, an appointment location of the particular appointment, or a combination thereof).

The liveness checker 130 may, subsequent to providing the GUI 1304 to the display, receive acoustic data 1312 (e.g., an acoustic signal). The liveness checker 130 may generate authentication user data by performing language recognition on the acoustic data 1312. The liveness checker 130 may provide the GUI 1306 to the display in response to determining that the authentication user data corresponds to a valid answer (e.g., matches the user data). For example, the liveness checker 130 may determine that the testing acoustic data 512, the acoustic data 1312, or both, correspond to a live user in response to determining that the authentication user data corresponds to a valid answer (e.g., matches the user data). The liveness checker 130 may determine that the acoustic data 1312 (e.g., an acoustic signal) corresponds to a valid answer in response to determining that the authentication user data corresponds to a valid answer (e.g., matches the user data). The liveness checker 130 may, in response to determining that the acoustic data 1312 (e.g., an acoustic signal) corresponds to a valid answer, determine that the user 110 is authorized. The GUI 1306 may indicate that the user 110 is authorized.

The method 1300 may thus enable liveness determination based on user data as backup for sensor-based liveness determination. For example, the user may be prompted to provide additional information that is likely to be known to an authorized user when authorization based on acoustic data, vibration data, or both, is unsuccessful. The liveness determination may be performed based on the additional information.

Figure 14:
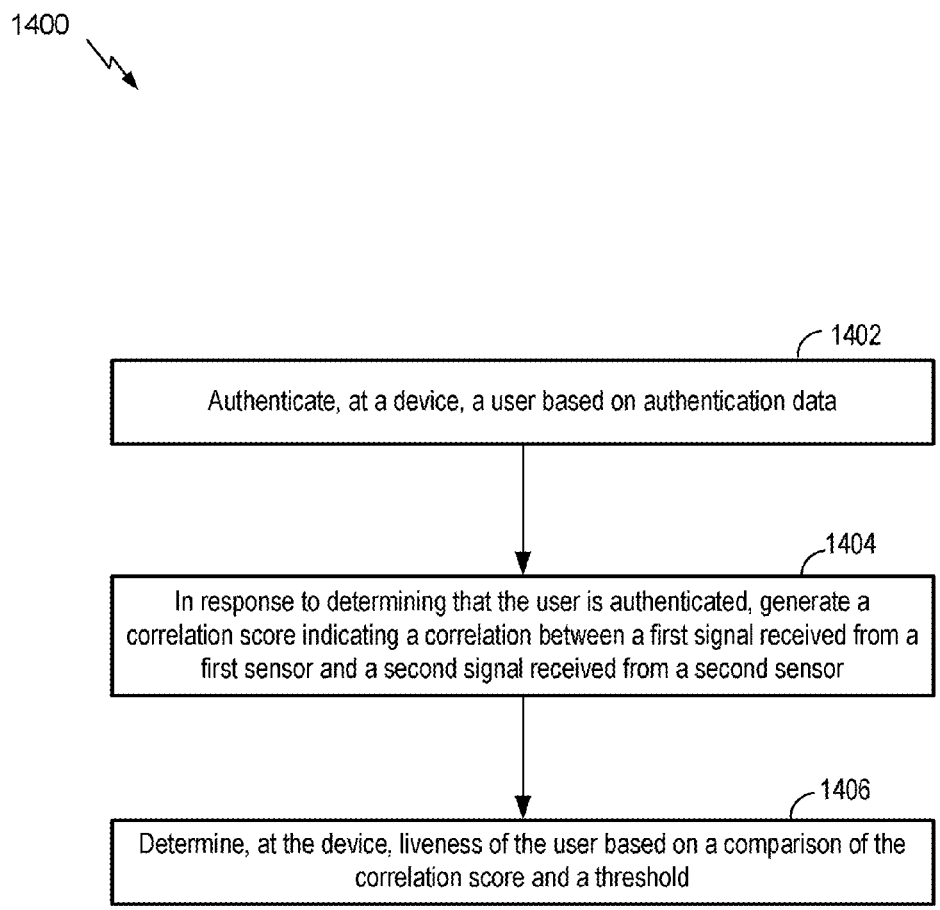
FIG. 14 is a flow chart illustrating another particular method of liveness determination based on sensor signals.

Referring to FIG. 14, a method is shown and generally designated 1400. The method 1400 may be performed by at least one of the liveness checker 130, the authenticator 120, the device 102, or the system 100 of FIG. 1.

The method 1400 includes authenticating, at a device, a user based on authentication data, at 1402. For example, the authenticator 120 of the device 102 may authenticate the user 110 based on the authentication data 122, as described with reference to FIG. 1.

The method 1400 also includes, in response to determining that the user is authenticated, generating a correlation score indicating a correlation between a first signal received from a first sensor and a second signal received from a second sensor, at 1404. For example, the liveness checker 130 of FIG. 1 may, in response to determining that the user 110 is authenticated, generate the correlation score 134 indicating a correlation between at least two of the first acoustic signal 128 received from the first microphone 108, the first vibration signal 124 received from the first vibration sensor 104, or the second vibration signal 126 received from the second vibration sensor 106, as described with reference to FIG. 1.

The method 1400 further includes determining, at the device, liveness of the user based on a comparison of the correlation score and a threshold, at 1406. For example, the liveness checker 130 of the device 102 of FIG. 1 may determine liveness of the user 110 based on the correlation score 134 and threshold 136, as described with reference to FIG. 1.

The method 1400 thus enables passive liveness determination during use of the device 102. In cases where the liveness checker 130 determines that the first acoustic signal 128 corresponds to a live user based on the comparison of the correlation score 134 and the threshold 136, the user 110 may be unaware that the device 102 has performed a liveness determination.

Figure 15:
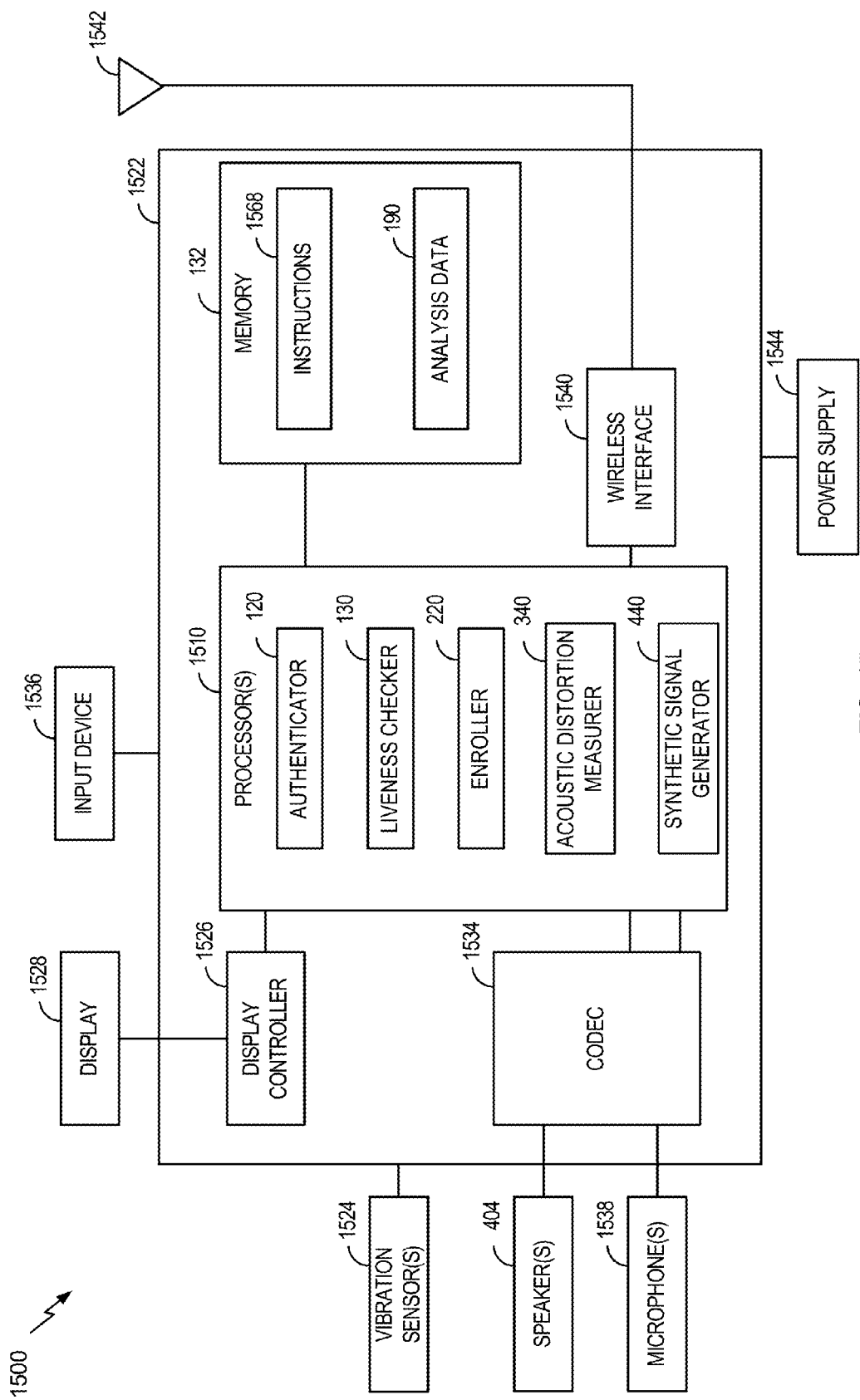
FIG. 15 is a block diagram of a device that is operable to support various aspects of one or more methods, systems, apparatuses, and computer-readable media disclosed herein.

Referring to FIG. 15, a block diagram of a device (e.g., a wireless communication device) is depicted and generally designated 1500. In various implementations, the device 1500 may have fewer or more components than illustrated in FIG. 15. In an illustrative implementation, the device 1500 may correspond to the device 102 of FIGS. 1-4. In an illustrative aspect, the device 1500 may operate according to one or more methods or systems described with reference to FIGS. 1-14.

In a particular aspect, the device 1500 includes one or more processors 1510 (e.g., a central processing unit (CPU), one or more digital signal processors (DSPs), or a combination thereof). The processors 1510 may include the authenticator 120, the liveness checker 130, the enroller 220, the acoustic distortion measurer 340, the synthetic signal generator 440, or a combination thereof.

The device 1500 may include a memory 132 and a CODEC 1534. The device 1500 may include a wireless interface 1540 coupled to an antenna 1542. The device 1500 may include the display 1528 coupled to a display controller 1526. The speakers 404, one or more microphones 1546, or both may be coupled to the CODEC 1534. The microphones 1546 may include the first microphone 108 of FIG. 1, the second microphone 312 of FIG. 3, or a combination thereof.

The memory 132 may include instructions 1568 executable by the processors 1510, the CODEC 1534, one or more other processing units of the device 1500, or a combination thereof, to perform methods and processes disclosed herein, such as the method 500 of FIG. 5, the method 600 of FIG. 6, the method 700 of FIG. 7, the method 800 of FIG. 8, the method 910, the method 920 of FIG. 9, the method 1000 of FIG. 10, the method 1100 of FIG. 11, the method 1200 of FIG. 12, the method 1400 of FIG. 14, or a combination thereof. The memory 132 may include the analysis data 190.

One or more components of the systems 100, 200, 300, and/or 400 may be implemented via dedicated hardware (e.g., circuitry), by a processor executing instructions to perform one or more tasks, or a combination thereof. As an example, the memory 132 may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include instructions (e.g., the instructions 1568) that, when executed by a computer (e.g., a processor in the CODEC 1534 and/or the processors 1510), may cause the computer to perform at least a portion of one of the methods described herein. As an example, the memory 132 may be a non-transitory computer-readable medium that includes instructions (e.g., the instructions 1568) that, when executed by a computer (e.g., a processor in the CODEC 1534 and/or the processors 1510), cause the computer perform at least a portion of the methods described herein.

In a particular aspect, the device 1500 may be included in a system-in-package or system-on-chip device (e.g., a mobile station modem (MSM)) 1522. In a particular aspect, the processors 1510, the display controller 1526, the memory 132, the CODEC 1534, and the wireless interface 1540 are included in a system-in-package or the system-on-chip device 1522. In a particular aspect, an input device 1536, such as a touchscreen and/or keypad, one or more vibration sensors 1524, and a power supply 1544 are coupled to the system-on-chip device 1522. Moreover, in a particular aspect, as illustrated in FIG. 15, the display 1528, the input device 1536, the speakers 404, the one or more microphones 1546, the one or more vibration sensors 1524, the antenna 1542, and the power supply 1544 are external to the system-on-chip device 1522. However, each of the display 1528, the input device 1536, the speakers 404, the one or more microphones 1546, the one or more vibration sensors 1524, the antenna 1542, and the power supply 1544 can be coupled to a component of the system-on-chip device 1522, such as an interface or a controller. The one or more vibration sensors 1524 may include the first vibration sensor 104, the second vibration sensor 106, or both.

The device 1500 may include a mobile phone, a communication device, a computer, a music player, a video player, an entertainment unit, a navigation device, a personal digital assistant (PDA), a decoder, a set top box, or any combination thereof.

In an illustrative aspect, the processors 1510 may be operable to perform all or a portion of the methods or operations described with reference to FIGS. 1-14. For example, the processors 1510 may receive (or access) the first acoustic signal 128 of FIG. 1 from the first microphone 108, the first vibration signal 124 from the first vibration sensor 104, the second vibration signal 126 from the second vibration sensor 106, or a combination thereof, as described with reference to FIG. 1. The processors 1510 may authenticate the user 110 of FIG. 1 based on the authentication data 122, as described with reference to FIG. 1. The processors 1510 may, in response to determining that the user 110 is authenticated, determine liveness of the user 110 based on a comparison of the correlation score 134 and the threshold 136, as described with reference to FIG. 1.

In conjunction with the described aspects, an apparatus is disclosed that includes means for authenticating a user based on authentication data. For example, the means for authenticating may include the authenticator 120, the processors 1510, one or more circuits or devices configured to authenticate a user based on authentication data (e.g., a processor executing instructions at a non-transitory computer readable storage medium), or a combination thereof.

The apparatus also includes means for determining liveness of the user based on a correlation score in response to determining that the user is authenticated. For example, the means for determining liveness may include the liveness checker 130, the processors 1510, one or more circuits or devices configured to authenticate a user based on authentication data (e.g., a processor executing instructions at a non-transitory computer readable storage medium), or a combination thereof. The correlation score (e.g., the correlation score 134 of FIG. 1) may indicate a correlation between a first signal (e.g., the first acoustic signal 128 of FIG. 1) received from a first sensor (e.g., the first microphone 108 of FIG. 1) and a second signal (e.g., the first vibration signal 124 of FIG. 1) received from a second sensor (e.g., the first vibration sensor 104 of FIG. 1).

Those of skill would further appreciate that the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the aspects disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
 a memory configured to store a threshold; and
 a processor configured to:
  generate direction of arrival data based on acoustic signals received from a plurality of microphones;
  determine variations in direction of arrival indicated by the direction of arrival data;
  authenticate a user based on authentication data;
  in response to determining that the user is authenticated and that the variations satisfy a variation threshold, generate a correlation score indicating a correlation between a first signal received from a first sensor and a second signal received from a second sensor; and
  determine liveness of the user based on a comparison of the correlation score and the threshold.

2. The device of claim 1, wherein the authentication data includes non-acoustic data.

3. The device of claim 1, wherein the authentication data includes at least one of an alphanumeric password, a finger print, an iris scan, or a facial image.

4. The device of claim 1, wherein the processor is configured to determine that the user is authenticated in response to determining that the authentication data matches enrollment data.

5. The device of claim 1, wherein the first sensor includes a first vibration sensor and the second sensor includes a second vibration sensor, and wherein the threshold is indicative of a threshold correlation between a first vibration signal generated by the first vibration sensor and a second vibration signal generated by the second vibration sensor when sounds corresponding to an acoustic signal are generated by the user.

6. The device of claim 1, wherein the first sensor includes a first vibration sensor and the second sensor includes a second vibration sensor, wherein the first signal is received at a particular time from the first vibration sensor, and wherein the second signal is received at the particular time from the second vibration sensor.

7. The device of claim 1, wherein the direction of arrival data indicates a first direction of arrival at a first time and a second direction of arrival at a second time, and wherein the variations include a difference between the first direction of arrival and the second direction of arrival.

8. The device of claim 1, wherein the processor and the memory are integrated into at least one of a mobile phone, a communication device, a computer, a music player, a video player, an entertainment unit, a navigation device, a personal digital assistant (PDA), a decoder, or a set top box.

9. The device of claim 1, wherein the processor is further configured to generate acoustic distortion data based on the first signal, wherein the first sensor includes a microphone, and wherein the processor is further configured to generate the correlation score in response to determining that the acoustic distortion data satisfies an acoustic distortion threshold.

10. The device of claim 9, wherein the acoustic distortion data includes a classification score, and wherein the processor is further configured to:
 extract acoustic features from the first signal; and
 determine the classification score based on the acoustic features and an acoustic model.

11. The device of claim 1, wherein the first signal includes a first vibration signal received from a first vibration sensor or a first acoustic signal received from a first microphone, and wherein the second signal includes a second vibration signal received from a second vibration sensor.

12. The device of claim 1,
 wherein the processor is further configured to:
  generate an enrollment correlation score indicating a particular correlation between a first particular signal received from the first sensor and a second particular signal received from the second sensor, and
  store enrollment data in the memory in response to determining that the enrollment correlation score satisfies an enrollment threshold, and
 wherein the user is authenticated based on a comparison of the authentication data and the enrollment data.

13. The device of claim 12, wherein the processor is further configured to determine the threshold based on the enrollment correlation score.

14. The device of claim 12, wherein the processor is further configured to store a sum of the enrollment correlation score and a tolerance value in the memory as the threshold.

15. A method of authentication comprising:
 generating, at a device, direction of arrival data based on acoustic signals received from a plurality of microphones;
 determining, at the device, variations in direction of arrival indicated by the direction of arrival data;
 determining, at the device, that a user is authenticated based on authentication data;
 determining, at the device, that the variations satisfy a variation threshold;
 in response to determining that the user is authenticated and that the variations satisfy the variation threshold, generating a correlation score indicating a correlation between a first signal received from a first sensor and a second signal received from a second sensor; and
 determining, at the device, liveness of the user based on a comparison of the correlation score and a threshold.

16. The method of claim 15, wherein the first sensor includes a first vibration sensor and the second sensor includes a second vibration sensor, and wherein the threshold is indicative of a threshold correlation between first vibrations that propagate through a body of the user and second vibrations that propagate through the body of the user when sounds corresponding to an acoustic signal are generated by the user.

17. The method of claim 15, wherein the first sensor includes a first vibration sensor and the second sensor includes a second vibration sensor, wherein the first signal is received at a particular time from the first vibration sensor, and wherein the second signal is received at the particular time from the second vibration sensor.

18. The method of claim 15, wherein the variation threshold is indicative of a threshold variation when sounds corresponding to the acoustic signals are received from a live user.

19. The method of claim 15, further comprising:
 generating, at the device, a direction of arrival correlation score indicating a particular correlation between the direction of arrival and the first signal, wherein the first sensor includes a microphone of the plurality of microphones,
 wherein the liveness of the user is based on a comparison of the direction of arrival correlation score and a direction of arrival threshold.

20. The method of claim 19, wherein the direction of arrival threshold is indicative of a threshold correlation between the direction of arrival and the first signal when sounds corresponding to the first signal are generated by a live user.

21. A computer-readable storage device storing instructions that, when executed by a processor, cause the processor to perform operations comprising:
generating direction of arrival data based on acoustic signals received from a plurality of microphones;
determining variations in direction of arrival indicated by the direction of arrival data;
authenticating a user based on authentication data;
in response to determining that the user is authenticated and that the variations satisfy a variation threshold, generating a correlation score indicating a correlation between a first signal received from a first sensor and a second signal received from a second sensor; and
determining liveness of the user based on a comparison of the correlation score and a threshold.

22. The computer-readable storage device of claim 21, wherein the operations further comprise extracting features based on the first signal and the second signal, wherein the correlation score is based on the features, and wherein the threshold is based on an anti-spoofing model.

23. The computer-readable storage device of claim 22, wherein the operations further comprise extracting enrollment features based on a first particular signal received from the first sensor and a second particular signal received from the second sensor, and wherein the anti-spoofing model is based on the enrollment features.

24. The computer-readable storage device of claim 21, wherein the operations further comprise:
generating a synthetic speech signal corresponding to one or more first words, the synthetic speech signal including one or more first prosody features;
providing the synthetic speech signal to a speaker;
receiving an acoustic signal via a microphone;
performing speech recognition to determine that the acoustic signal corresponds to one or more second words;
determining that the one or more second words are similar to the one or more first words; and
determining that the acoustic signal corresponds to one or more second prosody features,
wherein the correlation score is generated in response to determining that the one or more second prosody features are similar to the one or more first prosody features.

25. The computer-readable storage device of claim 24, wherein the one or more prosody features include at least one of loudness, duration, pause, or pitch.

26. The computer-readable storage device of claim 21, wherein the first sensor includes a microphone, wherein the first signal includes a first acoustic signal, wherein the operations further comprise receiving a second acoustic signal via the microphone, and wherein the correlation score is generated in response to determining that a difference between the first acoustic signal and the second acoustic signal satisfies a difference threshold.

27. The computer-readable storage device of claim 21, wherein the operations further comprise:
in response to determining that the correlation score does not correspond to a live user, generating a graphical user interface that includes a question;
providing the graphical user interface to a display;
receiving an acoustic signal via a microphone; and
in response to determining that the acoustic signal corresponds to a valid answer of the question, determining that the user is authorized.

28. The computer-readable storage device of claim 21, wherein the first sensor includes a first vibration sensor and the second sensor includes a second vibration sensor, wherein the first signal is received at a particular time from the first vibration sensor, and wherein the second signal is received at the particular time from the second vibration sensor.

29. An apparatus comprising:
means for authenticating a user based on authentication data;
means for determining variations in direction of arrival indicated by direction of arrival data, the direction of arrival data based on acoustic signals received from a plurality of microphones; and
means for determining liveness of the user based on a correlation score in response to determining that the user is authenticated and that the variations satisfy a variation threshold, the correlation score indicating a correlation between a first signal received from a first sensor and a second signal received from a second sensor.

30. The apparatus of claim 29, wherein the means for authenticating the user, the means for determining the variations, and the means for determining liveness are integrated into at least one of a mobile phone, a communication device, a computer, a music player, a video player, an entertainment unit, a navigation device, a personal digital assistant (PDA), a decoder, or a set top box.

* * * * *